United States Patent
Geronian et al.

(10) Patent No.: US 11,970,677 B2
(45) Date of Patent: Apr. 30, 2024

(54) SYSTEMS, METHODS, AND APPARATUSES TO OPTIMIZE ALL STAGES OF PRODUCTION OF SPARKLING WINE USING THE CHAMPAGNE METHOD

(71) Applicants: Armen Geronian, Pittsburgh, PA (US); Charles Bockstoce, Pittsburgh, PA (US); Philip Ejzak, Pittsburgh, PA (US)

(72) Inventors: Armen Geronian, Pittsburgh, PA (US); Charles Bockstoce, Pittsburgh, PA (US); Philip Ejzak, Pittsburgh, PA (US)

(73) Assignee: Armen Geronian, Pittsburgh, PA (US)

( * ) Notice: Subject to any disclaimer, the term of this patent is extended or adjusted under 35 U.S.C. 154(b) by 1026 days.

(21) Appl. No.: 16/846,010

(22) Filed: Apr. 10, 2020

(65) Prior Publication Data
US 2021/0316917 A1 Oct. 14, 2021

(51) Int. Cl.
*C12G 1/06* (2019.01)
*B65D 39/00* (2006.01)
(Continued)

(52) U.S. Cl.
CPC ........... *C12G 1/06* (2013.01); *B65D 39/0052* (2013.01); *B65D 45/322* (2013.01);
(Continued)

(58) Field of Classification Search
CPC ........ C12G 1/08; C12G 1/06; B65D 51/1644; B65D 51/24; B65D 39/0052; B65D 45/322
See application file for complete search history.

(56) References Cited

U.S. PATENT DOCUMENTS 4,932,543 A * 6/1990 Martus ............... C12G 1/08
215/6
6,260,474 B1 * 7/2001 Yahav ............... B65D 51/24
426/11
(Continued)

FOREIGN PATENT DOCUMENTS

CA 3101498 A1 * 1/2020 ............ B65D 45/20
GB 2230519 A * 10/1990 ............ B67C 9/00
(Continued)

OTHER PUBLICATIONS

"The Methods of Producing Sparkling Wine," Dummies, captured online on Oct. 25, 2019, 2 pages, https://www.dummies.com/food-drink/drinks/wine/the-methods-of-producing-sparkling-wine/.
(Continued)

*Primary Examiner* — Thien S Tran
(74) *Attorney, Agent, or Firm* — Elliott, Ostrander & Preston, P.C.

(57) ABSTRACT

Systems, methods, and apparatuses to optimize all stages of sparkling wine production using the 'Champagne' method. For instance, there is a specially configured apparatus utilized for a method for producing sparkling wine within the wine bottle through a secondary fermentation. The apparatus is attached to the wine bottle to seal in pressure. Specifically, a neck collar of the apparatus is positioned upon a neck section and a sealing cap is pressed onto a mouth opening wine bottle above the neck collar and coupled to the neck collar of the apparatus. A tensioner of the apparatus induces a clamping force between the neck collar and the sealing cap to seal the pressure generated from fermentation. A pressure indicator measures and displays pressure which is retained and limited to a maximum pressure within the bottle via a Pressure Reduction Valve (PRV) of the apparatus. Sediment from fermentation is removed without freezing via a riddling operations and evacuation of sediment from an inverted
(Continued)

bottle through a ball valve configured within the apparatus. Other related embodiments are disclosed.

20 Claims, 19 Drawing Sheets

(51) Int. Cl.
  *B65D 45/32* (2006.01)
  *B65D 51/16* (2006.01)
  *B65D 51/24* (2006.01)
  *C12G 1/08* (2006.01)

(52) U.S. Cl.
  CPC ......... *B65D 51/1644* (2013.01); *B65D 51/24* (2013.01); *C12G 1/08* (2013.01)

(56) References Cited

U.S. PATENT DOCUMENTS

| | | | | |
|---|---|---|---|---|
| 6,832,634 | B1* | 12/2004 | Chantalat | B01F 23/2361 261/DIG. 7 |
| 8,322,547 | B2* | 12/2012 | Alkemade | C12G 1/08 99/277.1 |
| 8,408,251 | B2* | 4/2013 | Alkemade | B67D 3/0032 137/546 |
| 10,188,966 | B2* | 1/2019 | Siu | B01D 21/2444 |
| 2013/0122142 | A1* | 5/2013 | Bowers | F16K 17/02 426/11 |
| 2014/0262899 | A1* | 9/2014 | Mociak | B65D 51/24 206/459.1 |
| 2017/0240405 | A1* | 8/2017 | Gibson | B67D 1/1202 |
| 2018/0162711 | A1* | 6/2018 | Gibson | B67D 1/1202 |
| 2020/0148526 | A1* | 5/2020 | Rittenburg | B67D 1/125 |

FOREIGN PATENT DOCUMENTS

| | | | | |
|---|---|---|---|---|
| WO | WO-0156354 A2 * | 8/2001 | | B65D 51/24 |
| WO | WO-2013005102 A1 * | 1/2013 | | B65D 41/02 |

OTHER PUBLICATIONS https://at2e.com/project/permanent-aphrometer/, screen capture on Oct. 25, 2019 of webpage for permanent aphrometer, 2 pages.
https://morewinemaking.com/products/wine-bottle-pressure-gauge.html, screen capture on Oct. 25, 2019 of webpage for wine bottle pressure gauge, 1 page.
https://www.jwii.com.au/product/bottle-pressure-tester/, screen capture on Oct. 25, 2019 of webpage for wine bottle pressure tester, 1 page.
https://www.sabastrumentazione.com/en/aphrometer-for-crown-cap, screen capture on Oct. 25, 2019 of webpage for champagne and beer bottle aphrometer for crown cap, 1 page.
Puckette, M., "How Sparkling Wine is Made," Wine Folly, Published online Jun. 6, 2016—Updated on Sep. 10, 2019, 7 pages, https://winefolly.com/review/how-sparkling-wine-is-made/.
Schiessl, C., "All the Ways to Make Champagne and Sparkling Wine, Explained," VinePair, Published online on Nov. 16, 2017, 3 pages, https://vinepair.com/articles/sparkling-wine-champagne-methods/.

* cited by examiner

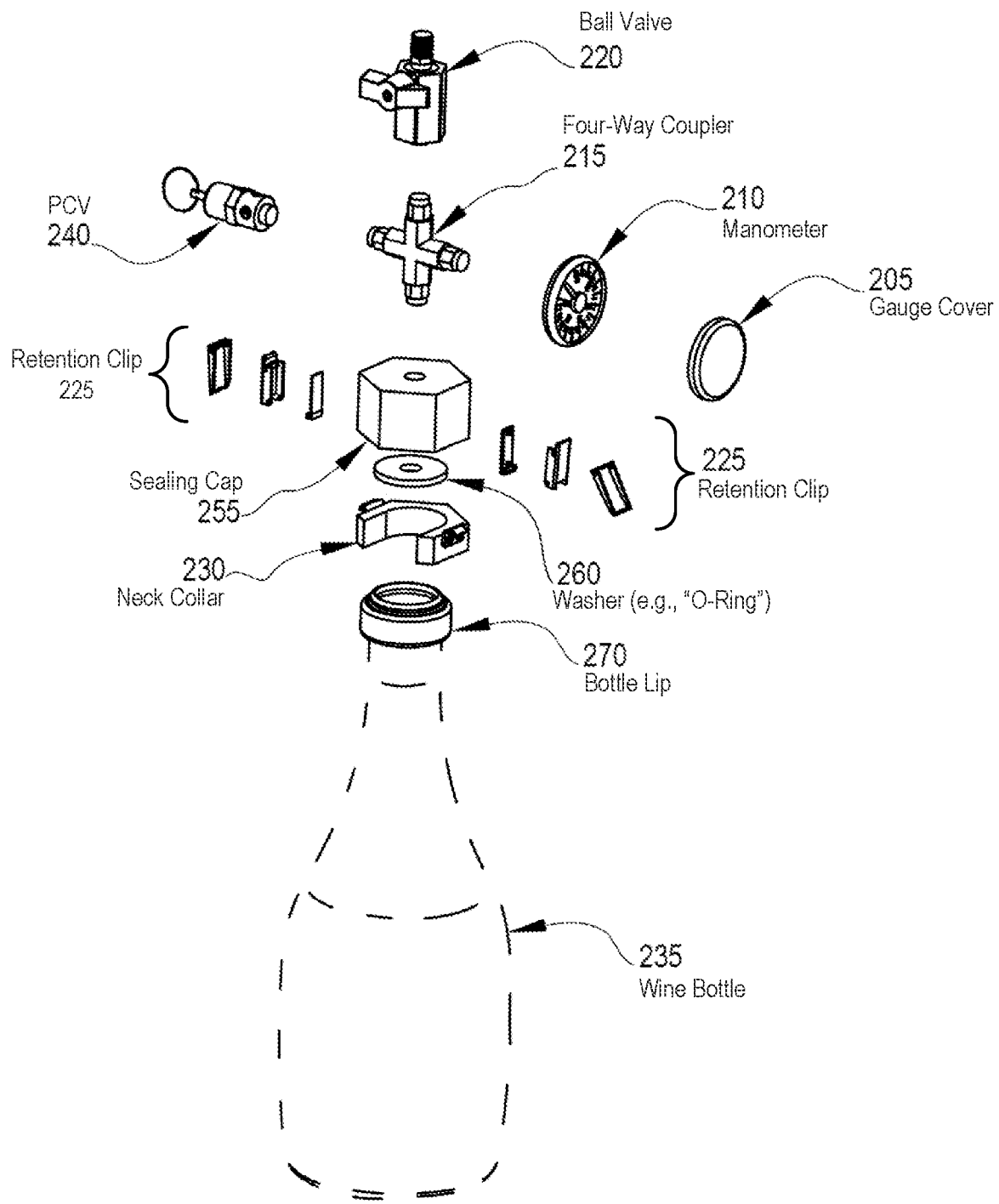

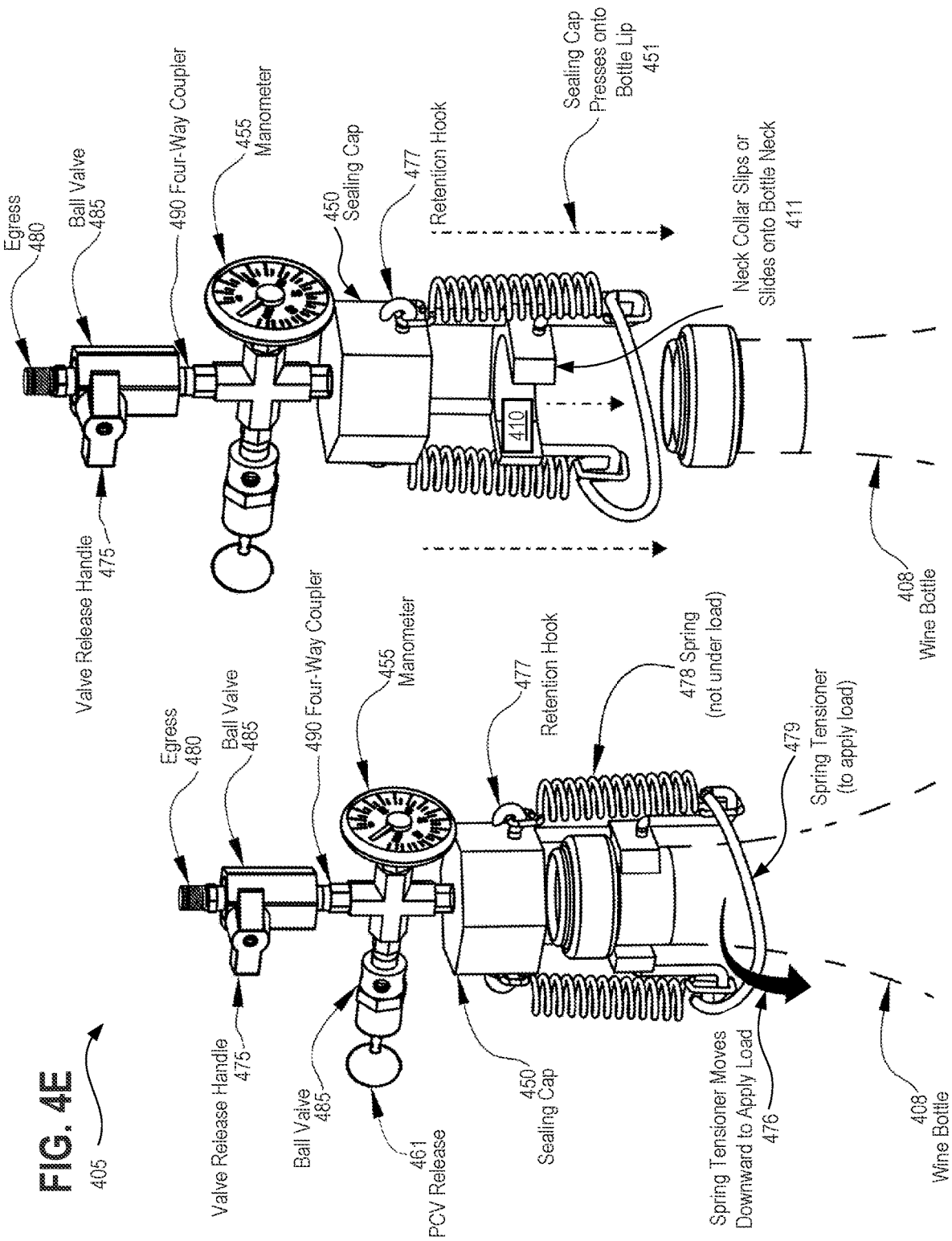

601

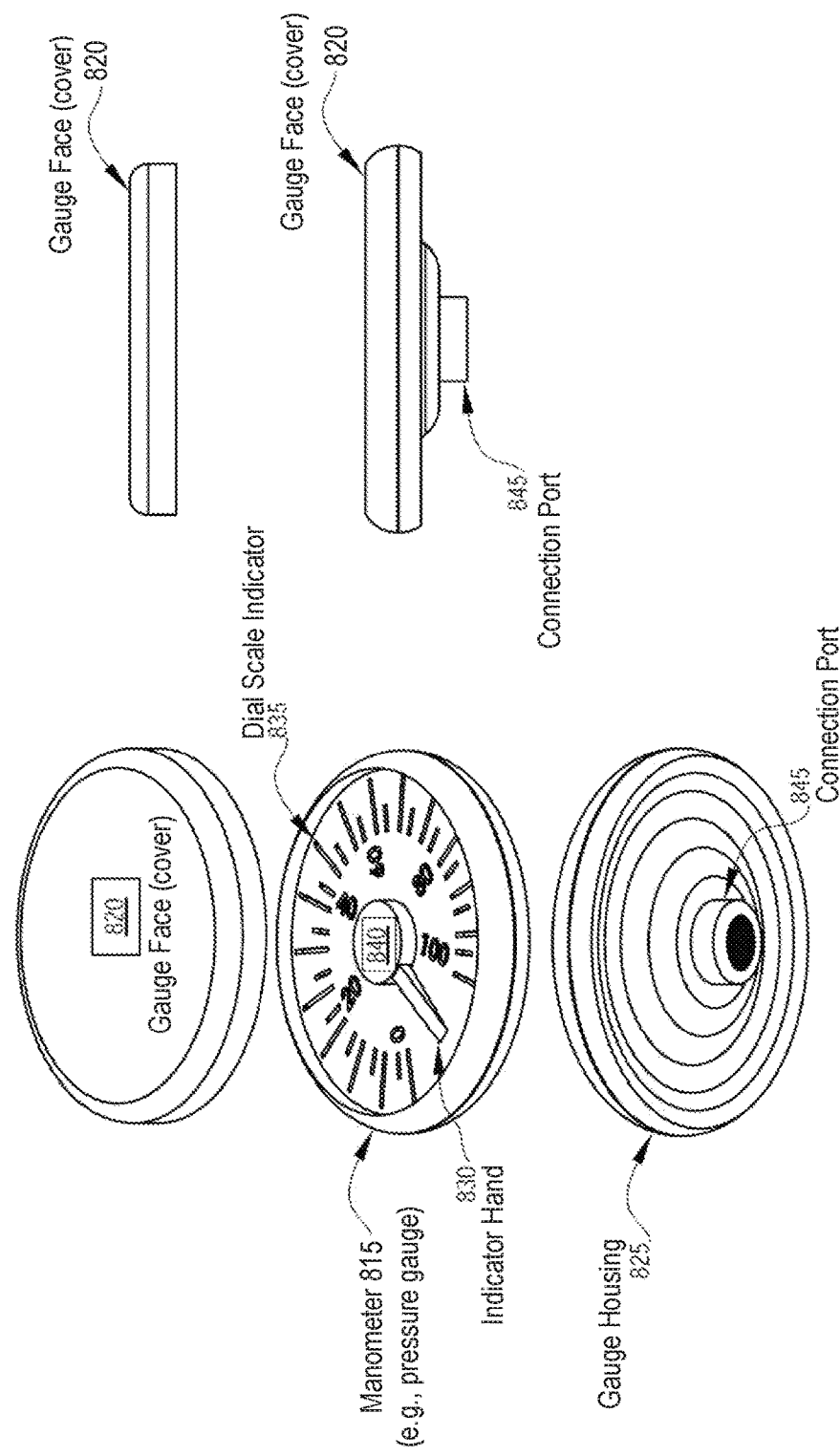

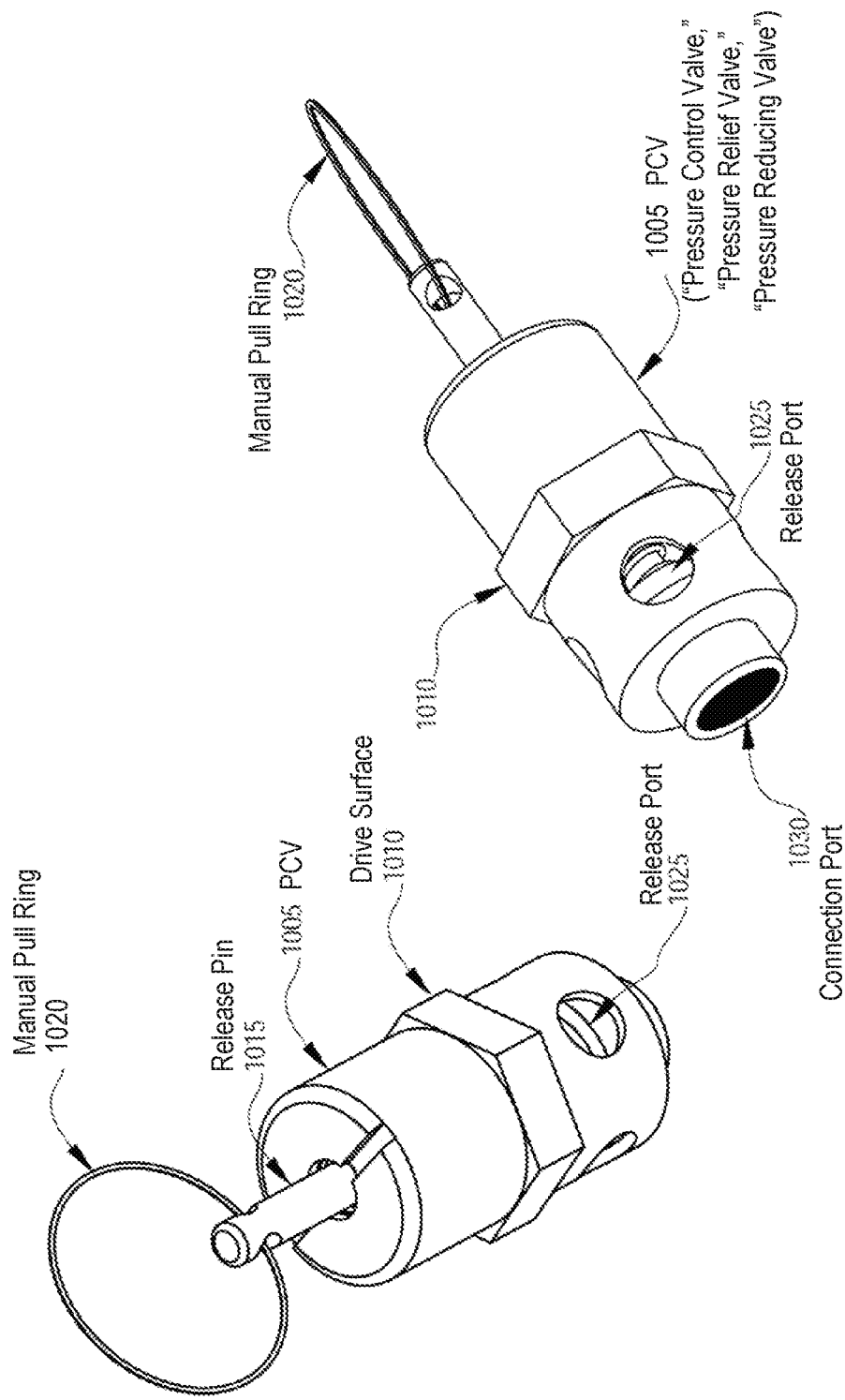

SYSTEMS, METHODS, AND APPARATUSES TO OPTIMIZE ALL STAGES OF PRODUCTION OF SPARKLING WINE USING THE CHAMPAGNE METHOD

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of sparkling wine production. More particularly, disclosed embodiments relate to systems, methods, and apparatuses to optimize all stages of sparkling wine production using the 'Champagne' method.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

Sparkling wine production is the method of winemaking specifically utilized to produce sparkling wine. Sparkling wine is the general category for all wines that produce bubbles at the surface after opening. Certain wines that produce bubbles upon opening are referred to as "fizzy" or "effervescent" or "bubbly" wines in various regions of the world. For instance, under European law, only wines that having greater than three (3) additional bars of pressure may be labeled as "sparkling" wine.

For the sake of the described embodiments, any wine that produces bubbles upon opening due to the production of the wine via a fermentation process will be referred to as "sparkling" wines.

Fermentation refers to the introduction of sugar into alcohol during winemaking which consequently results in carbon dioxide being absorbed into and then subsequently released from the wine. Carbon dioxide has the property of being highly soluble in wine and it is this very phenomenon that is utilized to produce so-called "sparkling" wines.

The base wine may be curated from a blend of wines originating from different grape varieties and potentially even different wineries, in which the varied distribution gives the final wine its unique character.

During the process of fermentation, consumed yeast cells form a precipitate which may contribute to appealing aromas of sparkling wine yet appears unappetizing and will therefore normally be removed before the wine is distributed.

It is the removal of this precipitate which introduces unique problems for winemakers utilizing the "Champagne" method of production for their sparkling wines.

The present state of the art may therefore benefit from the systems, methods, and apparatuses to optimize all stages of sparkling wine production using the 'Champagne' method as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 depicts an exploded view of an apparatus for optimizing all stages of sparkling wine production using the 'Champagne' method, in accordance with described embodiments;

FIG. 4E depicts a wine bottle being attached to another variation of the apparatus, in accordance with described embodiments;

FIG. 8 depicts the manometer of the apparatus in greater detail, in accordance with described embodiments;

FIG. 10 depicts the pressure control valve (PCV) of the apparatus in greater detail 1001, in accordance with described embodiments.

DETAILED DESCRIPTION

Figure 1A:
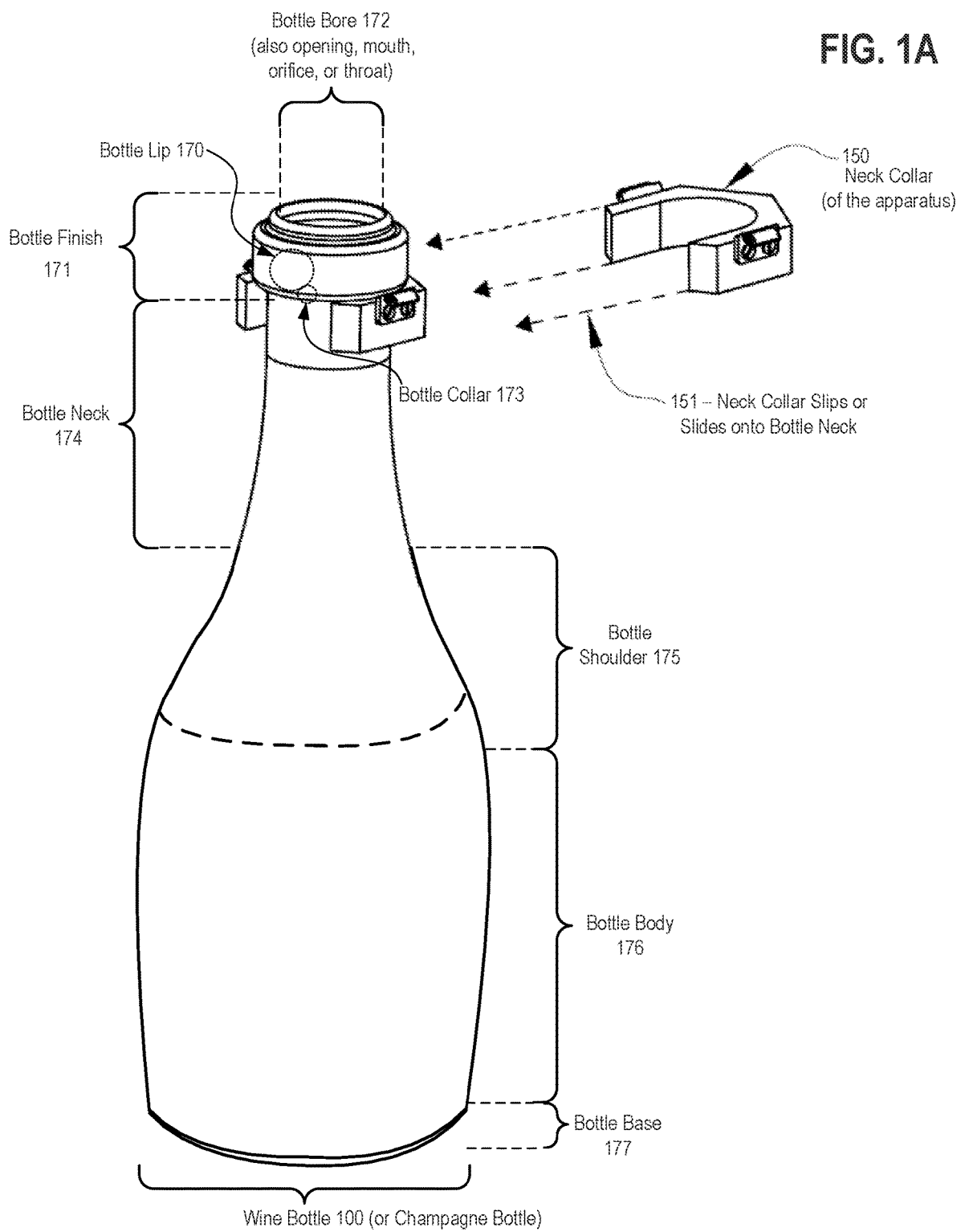
FIG. 1A depicts an exemplary view of a wine bottle to receive a neck collar of an apparatus used for optimizing all stages of sparkling wine production via the 'Champagne' method, in accordance with described embodiments.

Described herein are systems, methods, and apparatuses to optimize all stages of sparkling wine production using the 'Champagne' method.

Sparkling wine is produced utilizing a variety of methods, including the method which is referred to specifically as the "Champagne" method (often called the traditional method outside the Champagne region). Other methods include the "Ancestral" method, the "Transfer" method, the "Dioise" method, the "Continuous" method, and the "Soda" method.

Notwithstanding the wide array of available methods, sparkling wine is overwhelmingly produced through either the Champagne method or the Charmat method.

The Champagne method, in particular, is considered to be the classic sparkling vinification process and is widely believed to create the highest-quality, longest-lived, most complex sparkling wines in the world. The Champagne method also happens to be the most expensive, labor-intensive, and time-consuming means of sparkling wine production.

It is important to note here that the sparkling wine which is produced through the practice of the Champagne or "traditional" method is not itself Champagne. Rather, the end-product resulting from such a method is called "sparkling wine." The end-product which is referred to specifically as "Champagne" is in reference to only those sparkling wines which are produced affirmatively within the Champagne region of France under the rules of the appellation (which defines a legally protected geographical area permitted to have an indication used to identify where the grapes for a wine were grown). Thus, an end-product called "Champagne" is produced from the Champagne region of France, using specific grapes from the legally defined region, and utilizing the rules and methodology defined for that particular product.

The Champagne method of wine production specifically employs a secondary fermentation which takes place inside of the bottle within which the resulting end-product sparkling wine will be sold. Conventional means of production temporarily cap the wine after a solution of wine, sugar and yeast (called "liqueur de tirage") is added to a bottle of base wine. When the yeasts have finished working, they die and become "sur lie" or "lees" which are collectively the leftover yeast particles from autolysis resulting from the natural self-destruction of yeast cells by enzymes resulting from the fermentation. The lees sediment remains in contact with the sparkling wine until removed by the winemaker, contributing to texture, richness, and complexity of the resulting end-product wine. Certain wine producing regions even define minimum lees-aging requirements for wines from that region, whereas in other regions, it is left to the expertise and judgment of the winemaker.

Final stages of the Champagne method require that the winemaker remove the temporary cap from the wine bottle and disgorge the lees sediment through a process called riddling or "remuage." Riddling processes involve inverting the sparkling wine bottle until the lees sediment settles and rests at the bottom of the now upside-down wine bottle, specifically within the upside-down neck portion of the bottle. When the temporary cap is removed, the pressures inside of the wine bottle resulting from the fermentation process force the sediment out, thus leaving behind a sediment-free and perfectly clear end product within the wine bottle, to which the "final cork" may then be applied.

For the highest quality sparkling wines, the riddling or remuage is still performed manually, in which skilled cellar masters employ shaking and twisting techniques learned and practiced literally over the centuries by quality winemaking artisans. A skilled 'remueue' (or "bottle turner") can handle thousands of bottles a day, orienting the wine bottles into their neck down orientation, often utilizing an "A" frame shaped riddling rack called a "pupitre" or a wooden frame having holes by which to receive the wine bottles during the turning and riddling process.

The artisan often will rotate the wine bottles in stages, such as rotating the bottles by a ⅛ or ¼ of a turn at a time, to the right or left, sometimes utilizing a chalk mark on the bottom of the bottle for reference. The ultimate objective of this process is to consolidate as much of the sediment as possible into the neck-portion of the upside-down neck portion, thus leaving the remaining wine almost entirely free of sediment and crystal clear in its appearance. Manual riddling or remuage, depending on the winemaker's technique, may take upwards of 4-6 weeks and involve on as many as 25 turns per bottle.

Very often, the riddling process further requires the neck of the bottle to be frozen, so as to aid in the riddling process, without freezing the sparkling wine product. This supplemental process is technically difficult and error prone. The freezing process involves placing the bottles into a freezer, in their upside-down orientation (e.g., within the riddling rack or other device), with the freezer temperature at approximately 25-30 degrees Fahrenheit, and the winemaker then waits until the sediment in the neck is frozen but the sparkling wine is not frozen.

The wine bottles are then removed from the freezer, the upside-down bottles are then turned right-side-up, and a person manually removes the temporary cap from the wine bottle. Upon removal of the cap from the wine bottle, pressure inside the bottle pushes the frozen sediment (which is retained at the neck portion of the wine bottle) out of the mouth of the wine bottle, along with a potentially significant amount of the desired sparkling wine end product which is forced out of the bottle due to the internal pressure within the wine bottle. Not only is this process predictably messy and wasteful, resulting in the desired sparkling wine to launch from the bottle and spread throughout the area, drenching the person conducting the operation in the process, but this process is also potentially dangerous and has been the source of numerous injuries, including permanently blinding these operators.

At the stage that the operation is performed, the secondary fermentation operation has resulted in the generation of significant pressures inside of the wine bottle. These pressures are unknown and there is a significant risk to the human operator that handling the wine bottle under such pressures will cause the wine bottle to fail, sending glass shards throughout the work-space, and quite possibly into the face or body of the operator.

Even assuming that all goes well, after the sediment removal process completes, there will remain the problem of lost pressure and lost sparkling wine product from the wine bottle. The now partially empty and partially depressurized (and likely still gushing) wine bottle is therefore placed into a machine which both re-fills the wine bottle with compensate (e.g., more base wine, sugar, stabilizers, sparkling wine, etc.) equal in volume to the amount of sparkling wine product and sediment lost from the bottle (typically 50 to 100 milligrams) and also re-pressurizes the bottle. Introduction of very cold compensate may be utilized to minimize the amount of pressure loss or minimize the amount of compensating pressure required.

Because this sediment removal process is typically done manually, a high degree of expertise is required by the operator, who must judge when the frozen sediment is fully disgorged from the wine bottle and then quickly insert the still-gushing wine bottle into the machine which re-pressurizes and re-fills the bottle prior to final corking/capping of the completed end-product.

This highly labor-intensive process produces a sparkling wine of the highest possible quality, albeit at the cost of efficiencies that may be realized through industrialized and automated sparkling wine production means.

Conversely, the Charmat method permits winemakers to realize such industrial scale efficiencies, albeit at the cost of quality and craftsmanship. The Charmat method is a sparkling winemaking process that traps bubbles in wine via carbonation in large steel tanks. The Charmat technique, which is also referred to as the "metodo Italiano" or the "Marinotti" method or the "Tank" method or the "Sealed tank" method.

The Charmat method is also capital intensive, and therefore presents a high initial cost due to the needed investment in equipment. For example, the large stainless steel vats capable of withstanding the internal pressures developed via the fermentation process are highly specialized and thus, very expensive to procure. However, once a Charmat sparkling wine production operation is successfully established, very large volumes of sparkling wine may be produced at industrial scales, thus permitting Charmat sparkling wine producers to recoup their capital investment through volume production.

For individuals, small businesses, and low-volume artisans focused sparkling wine producers, the Champagne method is greatly preferred because it is adaptable to low volume production (e.g., permitting as few as a single bottle of sparkling wine to be produced) as well as results in a higher quality end-product. For example, with the Charmat method of sparkling wine production, fermentation pressures will generally peak around 60 PSI (e.g., "Pound-force per Square Inch" or "lbf/in$^2$") within the fermentation vats whereas the Champagne method of sparkling wine production will peak around 90 PSI internal to the wine bottle within which the sparkling wine is produced. The greater pressure correlates to a higher perceived quality and thus a more desirable finished goods product for the consumer as the greater internal pressure directly results in a greater quantity of bubbles in the wine.

Notwithstanding the production of higher quality sparkling wine through practice of the Champagne method, there are nevertheless several operational inefficiencies which may be improved through practice of the disclosed embodiments without deviating from the in-bottle production of sparkling wine which is critical to the Champagne method as it is understood by those skilled in this method of sparkling wine production.

Embodiments of the invention as described herein operate to overcome one or more of these inefficiencies, as will be described in greater detail below with reference to the various figures. All of the embodiments described herein are provided as improvements to the production of sparkling wine via the so-called "traditional" and "Champagne" method of sparkling wine production, which defines a method of sparkling wine production within the bottle which is the same bottle which will ultimately be sold.

FIG. 1A depicts an exemplary view of a wine bottle 100 to receive a neck collar 150 of an apparatus used for optimizing all stages of sparkling wine production via the 'Champagne' method, in accordance with described embodiments.

In particular, it may be observed here that the wine bottle 100 or "Champagne bottle" comprises an anatomy having various distinct portions, including, from the bottom up, the bottle base 177, the bottle body 176, the bottle shoulder 175, the bottle neck 174, and the bottle finish 171.

The portion of the wine bottle 100 called the "finish" 171 incorporates several sub-portions, including the opening into the wine bottle 100 which is called the bottle bore 172 or an orifice or the throat, as well as the bottle lip 170 at the upper portion of the bottle finish 171 and the bottle collar 173 at the bottom portion of the bottle finish beneath the bottle lip 170. The bottle collar 173 transitions into the bottle neck 174.

Further depicted here is the neck collar 150 of the apparatus which is described in greater detail below. Notably, the neck collar 150 is to slip or slide onto the bottle neck of the wine bottle as depicted by element 151, to be positioned beneath the bottle lip 170 and touching or adjacent to the bottle collar 173. The bottle collar 173 which is an element of the wine bottle's anatomy is not to be confused with the neck collar 150 which is a sub-component of the apparatus. The neck collar 150 of the apparatus may be referred to within this document simply as the "collar" and will be understood to be received at the neck portion 174 of the wine bottle 100 or Champagne bottle and prevented from rising up and slipping off the top of the wine bottle's neck 174 via the bottle lip 170 (and the bottle collar 173) which has a diameter greater than the wine bottle's neck 174 and greater than an inside diameter of the neck collar 150 of the apparatus.

Although not depicted here, certain wine bottles 100 may have a thread portion at the top of the bottle finish 171 which replaces the bottle lip portion 170. In such embodiments, the lower portion of the bottle thread operates to retain the neck collar 150 of the apparatus in its position when slid or slipped onto the neck 174 of the wine bottle 100 (refer to FIG. 4A for more details).

As described above, practice of the so-called "traditional" or "Champagne" method of sparkling wine production results in a sparkling wine produced within the wine bottle 100 as depicted here, which is the same wine bottle 100 which is ultimately labeled, shipped for distribution, and then sold as a finished goods consumer end product.

According to described embodiments, a base wine or "Cuvée" wine is added to the wine bottle 100 to initiate the sparkling wine production process. Sugar, yeast, and optionally other nutrients are then added to the wine bottle 100 having the base wine or Cuvée therein. Optionally, the sugar, yeast, and any nutrients may be added to the base wine or Cuvée, which is then introduced to the wine bottle 100 as a complete mixture, so as to initiate the fermentation process.

Once the base wine (e.g., Cuvée), the sugar, and the yeast introduced as a mixture into the wine bottle 100, a secondary fermentation process immediately begins as the active yeast will begin to "eat" or otherwise consume the sugars present within the wine bottle 100. This secondary fermentation process will occur for any mixture of base wine, sugar, and yeast, regardless of whether the mixture is present within a large vat as is done with the Charmat method or present within a single wine bottle 100, as is done with the "Champagne" method of production.

For small wineries and quality focused artisans, the "Champagne" method of production is a highly appealing choice due to the low initial cost of capital investment and the higher resulting quality of sparkling wine. However, the "Champagne" method is not without complexity. Many wineries have developed expertise and specialized techniques utilized by their winemakers over decades or sometimes centuries, which are passed down throughout the generations. These wineries may have their own expertise and techniques to accommodate variations in the production process. This knowledge is the result of trial and error with many batches of sparkling wine that is accumulated over many iterations.

Thus, producers initiate the sparkling wine production process via the "Champagne" method by introducing each of the base wine, the sugar, and the yeast into the wine bottle 100, which is then capped, typically with a temporary metal cap similar the cap utilized on a beer bottle.

Once capped, the fermentation process resulting from the base wine, sugar, and yeast within the wine bottle should result in the production of alcohol and cause the pressures inside the bottle due to the generation of Carbon dioxide gas ($CO_2$), both resulting as a byproduct of the yeast's consumption of sugars.

Experienced wineries and winemakers will understand generally that if they add certain ratios of base wine, sugar, and yeast, and then allow the secondary fermentation process to advance for a certain period of time, such as two months, then they will generally achieve a good result, with little waste. Such ratios and time-periods representing the application of those wineries' and winemakers' collected wisdom. For example, an experienced winemaker may estimate that for a particular base wine, with a specified ratio of sugars and yeast, a two month or a three month period of time is sufficient for all bottles sitting at a regular temperature of 68-70 degrees Fahrenheit, to fully undergo and complete their secondary fermentation process.

However, simply the fermentation process should begin and should result in the production of alcohol and Carbon dioxide gas, does not necessarily mean that all things go according to plan. Once the bottle is capped, conventional methodologies applying the "Champagne" method of production simply have no means whatsoever by which to monitor, control, or adjust the fermentation process.

In fact, many things can go wrong. For example, new wineries and inexperienced winemakers may be unfamiliar with appropriate ratios or time periods. Both experienced and inexperienced wineries may utilize a base wine with a different chemistry than is typical (e.g., such as non-typical acidity, alcohol content, proteins, unconsumed sugars in the base wine, as well as other trace elements), all of which can drastically affect the initiation and advancement of the secondary fermentation process necessary to produce the sparkling wine.

Even environmental conditions, such as a change in temperature at the time of initiating the secondary fermentation process or during the course of fermentation may affect the end result. Humidity levels present at the time the base wine or Cuvée is added and mixed with sugars and yeast within the wine bottle 100 may affect the sparkling wine production process. The quality of the yeast itself, the variety, the source, the genetic strain, the granular size, the surface area, etc., may all affect the sparkling wine production process, and yet, the winemaker applying conventional methodologies has literally no control or understanding of what is happening inside of the wine bottle 100 once capped.

It is even possible for the secondary fermentation process to simply fail at its onset, that is to say, fermentation never begins, or the fermentation process may end prematurely, prior the desired consumption levels of the sugars, prior to the desired Carbon dioxide gas ($CO_2$) production levels, prior to the attainment of desired pressures, etc.

Even in the situation when the fermentation process generally advances according to plan and expectations of an expert winemaker, there still remains process inefficiencies and an opportunity cost, as the period allowed for the secondary fermentation process (e.g., two months according to the above example), is little more than an educated and experienced "guess" based on prior results, assuming consistent conditions or at least, conditions consistent with prior known favorable production results.

Such guess work leaves much to be desired. For instance, additional efficiencies may be realized if the winemaker better understands when the secondary fermentation process actually ends, rather than simply guessing or allowing sufficient time for the process to complete with some safety buffer.

For example, consider a fermentation process that successfully ends in 6-weeks, and yet, the winery permits the process to advance for 8-weeks, not knowing precisely when a given batch of production will be complete. This resulting 2-week time buffer is effectively a 25% waste in efficiency, time spent on allowing for unknowns, when the sparkling wine process could be finalized, the product shipped, and a new batch initiated.

Worse yet, consider the winemaker allowing a batch to wait for the two month period, only to realize after the fact that fermentation never began, and not only is the product entirely wasted, but the entire two-month period of time has been wasted, during which any storage space, riddling equipment, and labor utilized during the two-month period will be entirely applied to the wasted product in futility.

Even considering that processes are most likely to advance according to expectations, there remains potential inefficiencies for the individual wine bottles 100 constituting any given batch, given that each bottle will complete its fermentation process at a potentially different time than other wine bottles even within the same batch.

Several issues present in the conventional art are addressed through practice of the disclosed embodiments, including the lack of knowledge of what is happening inside the bottle during the secondary fermentation process (e.g., due to too high or low ambient temperature, an improper recipe due to improper amounts and ratios of sugar or yeast) or simply the resulting inefficiencies induced into the process as a result of having to wait for a period of time as a safety buffer for the secondary fermentation process to complete. Still further, practice of the disclosed embodiments may overcome possibly dangerous production situations in which, for example, the ambient temperature rises due to weather or due to a loss of air conditioning, which then in turn causes the fermentation process to accelerate and over-produce, resulting in the wine bottles having internal pressures exceeding their design constraints (e.g., pressures exceeding 100 PSI for a bottle designed to withstand 90 PSI), which then results in the bottles exploding, possibly when near human operators or when being handled by human operators.

Application and use of the systems, methods, and apparatuses to produce sparkling wine, using the 'Champagne' method as is described herein, is therefore needed to improve safety, reduce the inefficiencies, potentially improve overall quality of the resulting sparkling wine, and to reduce the overall cost of production.

Figure 1B:
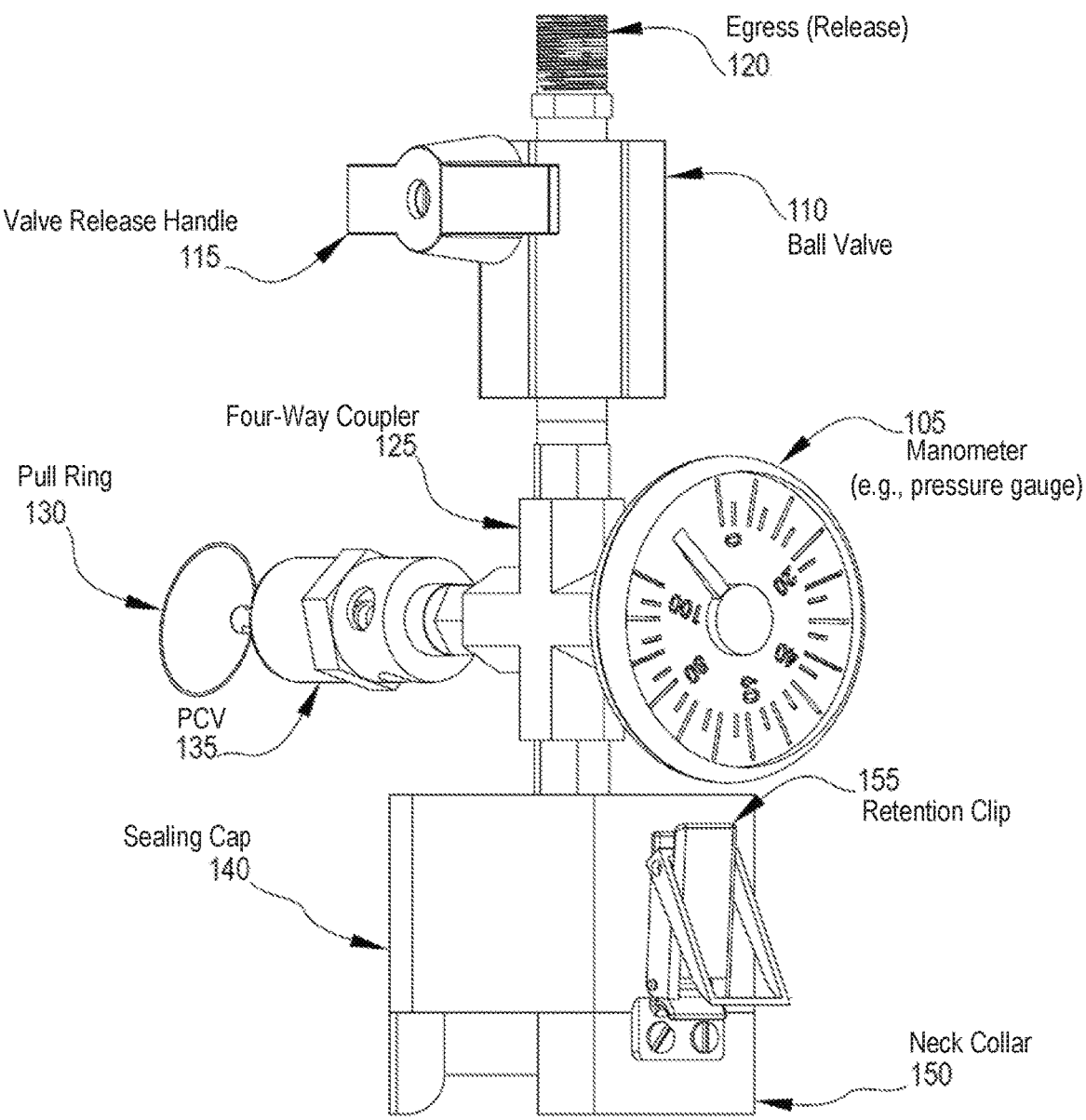
FIG. 1B depicts an exemplary view of an apparatus for optimizing all stages of sparkling wine production using the 'Champagne' method, in accordance with described embodiments.

FIG. 1B depicts an exemplary view of an apparatus 101 for optimizing all stages of sparkling wine production using the 'Champagne' method, in accordance with described embodiments.

Beginning with element 150 at the bottom of the diagram, there is depicted a neck collar 150 of the apparatus which is to couple with a wine bottle by slipping the neck collar 150 around a neck portion of a wine bottle. For example, the neck collar 150 may be positioned beneath a lip 170 of the wine bottle, beneath a "bottle collar" of the wine bottle formed at a bottom most portion of a wine bottle's finish, or beneath the threads of a wine bottle.

The neck collar 150 of the apparatus 101 detachably couples with the sealing cap 140 for purposes of attachment with a wine bottle and subsequent removal from a wine bottle. The retention clips 155 fasten the sealing cap 140 to the neck collar 150 and induces tension between the sealing cap 140 and the mouth or opening of a wine bottle, when the apparatus 101 is attached to the wine bottle.

Further depicted is a four-way coupler 125 which is attached at a first port with the sealing cap, attached at a second port with a manometer 105 (e.g., a pressure gauge), attached at a third port with a Pressure Control Valve (PCV) or with a similar pressure relieve valve or a pressure reducing valve, and attached at a fourth port to a ball valve 110. Pressure may be released from the PCV 135 automatically upon a pre-determined pressure being attained within the wine bottle or alternatively by manually retracting the pull-ring 130 from the PCV 135. Pressure may also be released from the wine bottle through operation of the ball valve 110 by turning the valve release handle 115, permitting pressure and contents to escape from the wine bottle through the egress or release 120 of the ball valve.

The manometer 105 of the apparatus aids the winemaker by informing the winemaker of the present state of pressure within the wine bottle 100 at any given time. The manometer 105 measures and displays the internal pressure inside of the wine bottle 100 which may then be interpreted to understand whether the secondary fermentation process began correctly, whether the secondary fermentation process is continuing or has completed, and whether the recipe or ratios of base wine, sugars, and yeast were appropriate to ferment and to generate the desired amount of internal pressure within the wine bottle.

For example, the winemaker may read and evaluate the pressure for any given wine bottle via the corresponding apparatus throughout the fermentation process and identify any possible outliers, defects, or non-conforming bottles undergoing fermentation. Consider for example that a wine bottle capped via the sealing cap 140 attached to the apparatus typically reaches an internal pressure of 20 PSI after 2 weeks, and yet, the bottles for a current batch are displaying different reading, such as 10 PSI or 30 PSI. Such an occurrence may thus be investigated much sooner (e.g., through testing of sample wine bottles, etc.) than is possible without use of the manometer 105 of the apparatus.

Even a large sparkling wine producer which utilizes the same grapes or base wine, the same ratios of sugars and yeast, the same production environment, etc., and has developed and refined their process over centuries and thus accumulated significant expertise, can still benefit from use of the disclosed apparatus and practice of the disclosed embodiments. For example, despite such a winemaker having very deep and broad expertise, it simply is not realistic to expect all aspects of production to remain constant (e.g., grape or base wine chemistry, yeast characteristics, sugar quality, environmental parameters, human operators, equipment, etc.). Therefore, even the most experienced winemakers and wineries will benefit from practice and use of the disclosed embodiments.

Additionally depicted here is the PCV 135, also called a PRV or pressure relief valve or pressure reduction valve. The PCV 135 is configured with a pre-determined pressure, such as 60 PSI or 90 PSI, or 100 PSI, etc., and undertakes no change whatsoever unless and until that pre-determined pressure is reached. If the pre-determined pressure is attained, then the PCV 135 will automatically, and without human intervention, will automatically open to release pressure inside of the bottle down to the pre-determined limit, within some margin of error. Utilization of this PCV 135 component with the apparatus as depicted drastically improves safety of the winery operators having to handle, manipulate, or otherwise be in the vicinity of the pressurized wine bottles 100.

Optional embodiments may utilize an apparatus with a three-way coupler that operates via the sealing cap 140 coupled with the wine bottle 100 and the manometer 105 and the ball valve 110, but lacks a PCV 135, for instance, for a large scale manufacturer that desires to have a sub-set of its wine bottles 100 equipped with the PCV as a safety precaution may have some percentage or some sub-set quantity of its wine bottles undergoing fermentation be equipped with the PCV 135, but not all. Similarly, such a manufacturer may have some portion of its wine bottles undergoing fermentation be equipped with the manometer 105, but not all, and yet configure all apparatuses coupled with the wine bottles 100 undergoing fermentation to have a PCV 135 so as to maximize safety of operations.

Further depicted is the ball valve 110 having the egress 120 and the valve release handle. Use of the ball valve 110 of the apparatus sealed/coupled with the wine bottle 110 permits a more efficient process than is possible through use of the conventional arts.

Notably, after riddling of the wine bottle and when the winemaker is satisfied that the secondary fermentation process has concluded or has advanced to the desired state, the operator may then proceed to evacuate the lees sediment from the wine bottle 100 in a faster, cleaner, safer, less wasteful, and significantly more controlled manner.

This is possible because unlike conventional methods which typically require the neck of the wine bottle 100 to be frozen, thus freezing the lees sediment into the neck of the wine bottle 100 or disgorgement, the operator may evacuate the lees sediment from the wine bottle at ambient temperatures, and without removal of the sealing cap 140 from the wine bottle.

Riddling of the wine bottles 100 may still be performed throughout the fermentation process or after fermentation, at the discretion of the sparkling wine producer. Once the wine bottle 100 is inverted and oriented into its upside-down position, the sediment may be removed in a controlled process, without freezing any portion of the wine bottle or the sparkling wine product. This is done by rotating the valve release handle of the ball valve 110 at least partially, thus permitting the internal pressure of the wine bottle 100 to force the sediment out of the mount of the wine bottle 100, through the egress port of the sealing cap 140, through the four-way coupler 125 (or three-way coupler or two-way coupler depending on the configuration of the apparatus), into the ball valve 110 and past the ball valve control surface (e.g., the ball of the ball valve, the butterfly flange of a butterfly valve, etc.), and out the egress or release port 120 of the ball valve. This can be done by turning the valve release handle 115 slowly, partially, fully, etc., and allowing the sediment under pressure to evacuate the wine bottle 100 completely. The operator may then proceed to close the ball valve 110 when the sediment is gone or largely gone from the sparkling wine. For example, when the sparkling wine product also evacuating the egress of the ball valve 110 runs clear, the operator may close the valve on the presumption that the clear sparkling wine indicates a sufficient absence of sediment leaving the wine bottle.

Compensating base wine, sugars, or other final ingredients may then be introduced back into the wine bottle through the egress 120 port (now an ingress) of the ball valve. The wine bottle may then be cooled, the sealing cap 140 removed or decoupled from the wine bottle 100, and the final cork inserted into the wine bottle.

Alternatively, the wine bottle 100 and its contents, now free of lees sediment, may be cooled, the apparatus removed by decoupling the sealing cap 140 from the wine bottle 100, and then compensating base wine, sugars, or other final ingredients may then be introduced back into the wine bottle through the mouth 172 of the wine bottle 100, and then at that stage, the wine bottle 100 is capped or corked with its final cork that will be in place when the wine bottle 100 and its contents ships as a finished goods consumer end product.

Dropping the temperature reduces the pressure inside of the wine bottle and consequently, less compensating pressure is needed or potentially no compensating pressure is needed.

With such a process, not only is freezing no longer required, but the operation results in less mess as the evacuation of sediment and sparkling wine product is no longer gushing uncontrollably from an un-capped bottle due to the sealing cap 140 remaining in place and the pressure and evacuation of product and sediment being controllable via the ball valve 110.

Further still, less sparkling wine product is lost as the evacuation process may be terminated immediately upon the sediment determined to have been evacuated from the wine bottle 100 by the operator. Still further, the process is significantly safer for the human operator as the presence of the PCV 135 ensures that there is no risk of the internal pressure within the wine bottle 100 exceeding specifications due to the PCV 135 automatically operating to reduce any excess pressure without human intervention.

And still further, production costs are lowered not only through the reduction of waste, but additionally through the elimination of the costly freezing process which consumes both time, labor, and energy costs to drive the freezer.

The device allows sparkling wine producers, both large and small, to save significant costs due to reduction in losses of sparkling wine product, due to elimination of the need for highly skilled labor, due to reduced energy costs, and due to more efficient processes reducing the total time required from the start of the sparkling wine secondary fermentation process through the final corking, labeling, and shipping for distribution of a finished goods consumer end product of high quality sparkling wine.

While the above description is provided in the context of sparkling wine production within a wine bottle or a Champagne bottle 100, the apparatus and methods described herein are not so limited. For instance, production of beer may undergo a fermentation process within a beer bottle, especially for specialty, batch, and home-brew beer makers. Thus, the apparatus 101 may be coupled to such a beer bottle via the sealing cap 140 so as to carry out a similar process. Similarly, production of a port wine with a slight amount of bubbles may be produced within the wine bottle, and again, the apparatus 101 may be coupled to such a wine bottle via the sealing cap 140 so as to carry out a similar process for the production of a port wine with a small amount of bubbly, fizz, or carbon dioxide.

FIG. 2 depicts an exploded view 200 of an apparatus for optimizing all stages of sparkling wine production using the 'Champagne' method, in accordance with described embodiments.

In particular, it may be observed at the bottom portion of the figure a wine bottle 235 which is to receive the apparatus. In particular, the neck collar 230 of the apparatus will be slid beneath the bottle lip 270 and the sealing cap 255 will be placed atop the wine bottle 235 at the mouth of the wine bottle 235 and will be sealed against the wine bottle 235 via the washer 260 (e.g., "O-Ring") which is positioned between the top-most portion of the wine bottle's mouth and interior to a mouth portion of the sealing cap 255 which is to receive the top of the wine bottle. The retention clips 255 retain a compressive force upon the washer 260 when clamped shut, thus holding the neck collar 230 and the sealing cap 255 together.

Additionally depicted here are a manometer 210 and its gauge cover 205, the ball valve 220, and the PCV 240, each of which attaches with the four-way coupler 215 and thus indirectly to the sealing cap 255.

Figure 3A:
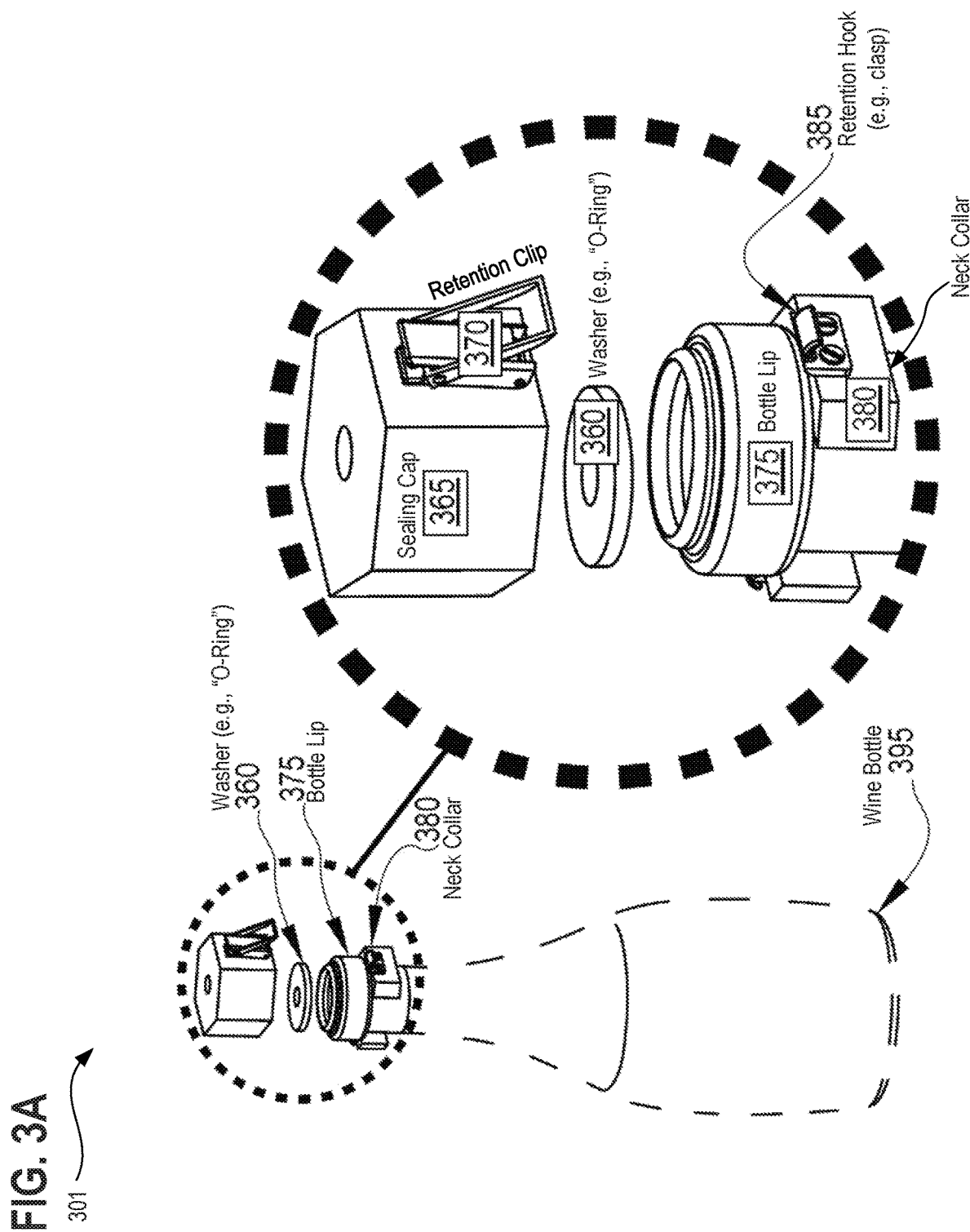
FIG. 3A depicts a more detailed view of the sealing cap and neck collar 380 oriented relative to the wine bottle to which the apparatus will be attached, in accordance with described embodiments.

FIG. 3A depicts a more detailed view 301 of the sealing cap 365 and neck collar 380 oriented relative to the wine bottle to which the apparatus will be attached, in accordance with described embodiments.

In particular, it may be observed at the left-hand portion of the figure, a wine bottle 395 which is to receive the apparatus. In particular, the neck collar 380 of the apparatus is shown here as having been slid beneath the bottle lip 375. The washer 360 is oriented atop the bottle opening and beneath the sealing cap 365. Further depicted are the retention clips 370 which hook to the retention hooks 385 or clasps, so as to maintain a compressive force upon the washer 360 when clamped shut, thus holding the neck collar 380 and the sealing cap 365 together.

Figure 3B:
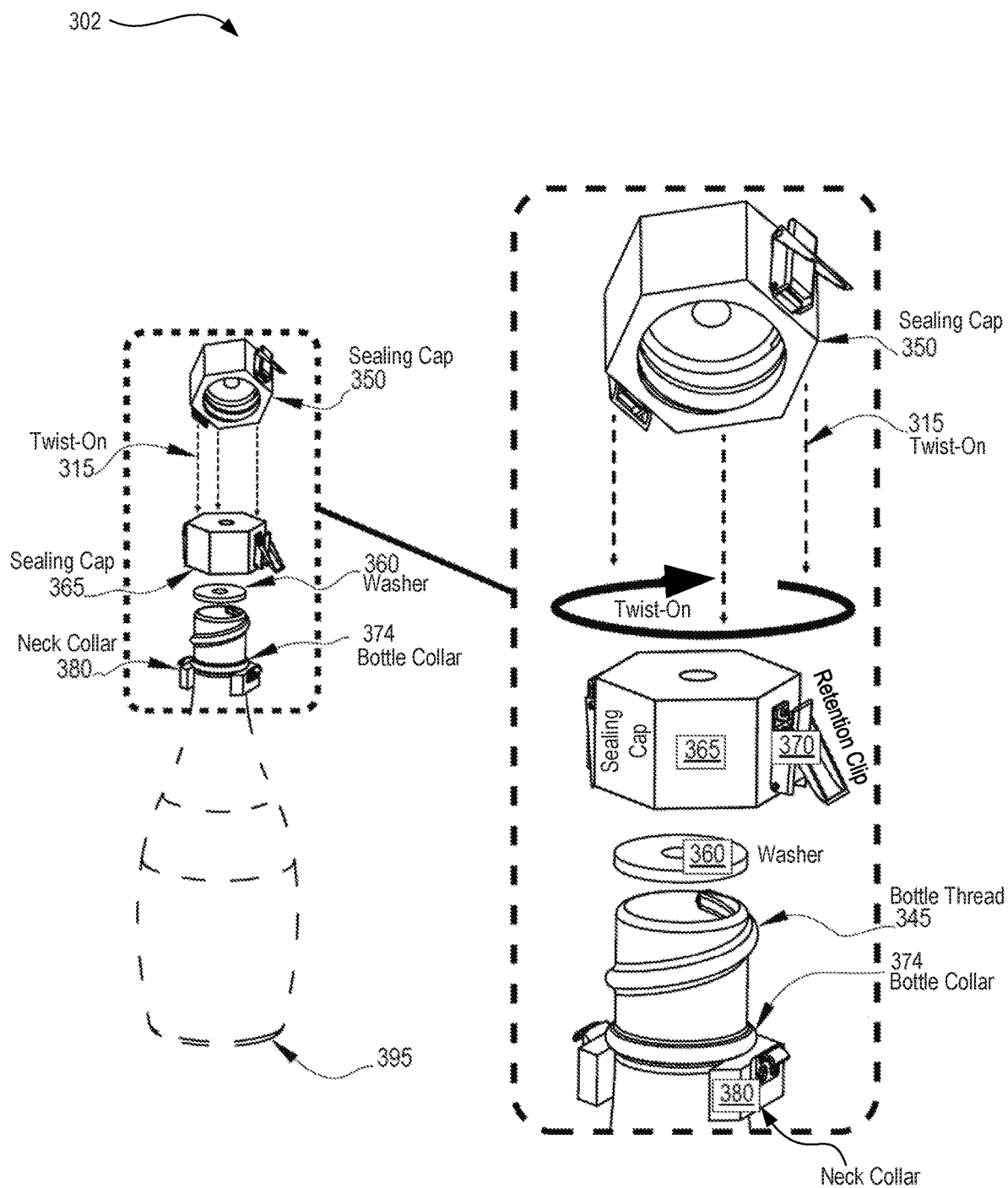
FIG. 3B depicts an alternative installation procedure of the sealing cap for a wine bottle having a threaded finish, in accordance with described embodiments.

FIG. 3B depicts an alternative installation procedure 302 of the sealing cap 350 for a wine bottle 395 having a threaded finish, in accordance with described embodiments.

In particular, it may be observed at the left-hand portion of the figure, a wine bottle 395 which is to receive the apparatus. Further detail is provided on the right-hand side of the figure, specifically showing how the sealing cap 350 is affixed to wine bottle 395 to seal in contents and pressure.

In particular, the neck collar 380 of the apparatus is shown here as having been slid beneath the bottle collar 374 which is formed beneath the bottle thread 345. The washer 360 is oriented atop the bottle opening and beneath the sealing cap 365 which is to twist-on 315 to the wine bottle 395 via the bottle thread 345. Further depicted are the retention clips 370 which hook to the retention hooks 385 or clasps, so as to maintain a compressive force upon the washer 360 when clamped shut, thus holding the neck collar 380 and the sealing cap 365 together. The twist-on 315 installation of the sealing cap 350 further contributes to a compressive force against the washer 360 so as to seal pressures into the wine bottle 395.

Figure 4A:
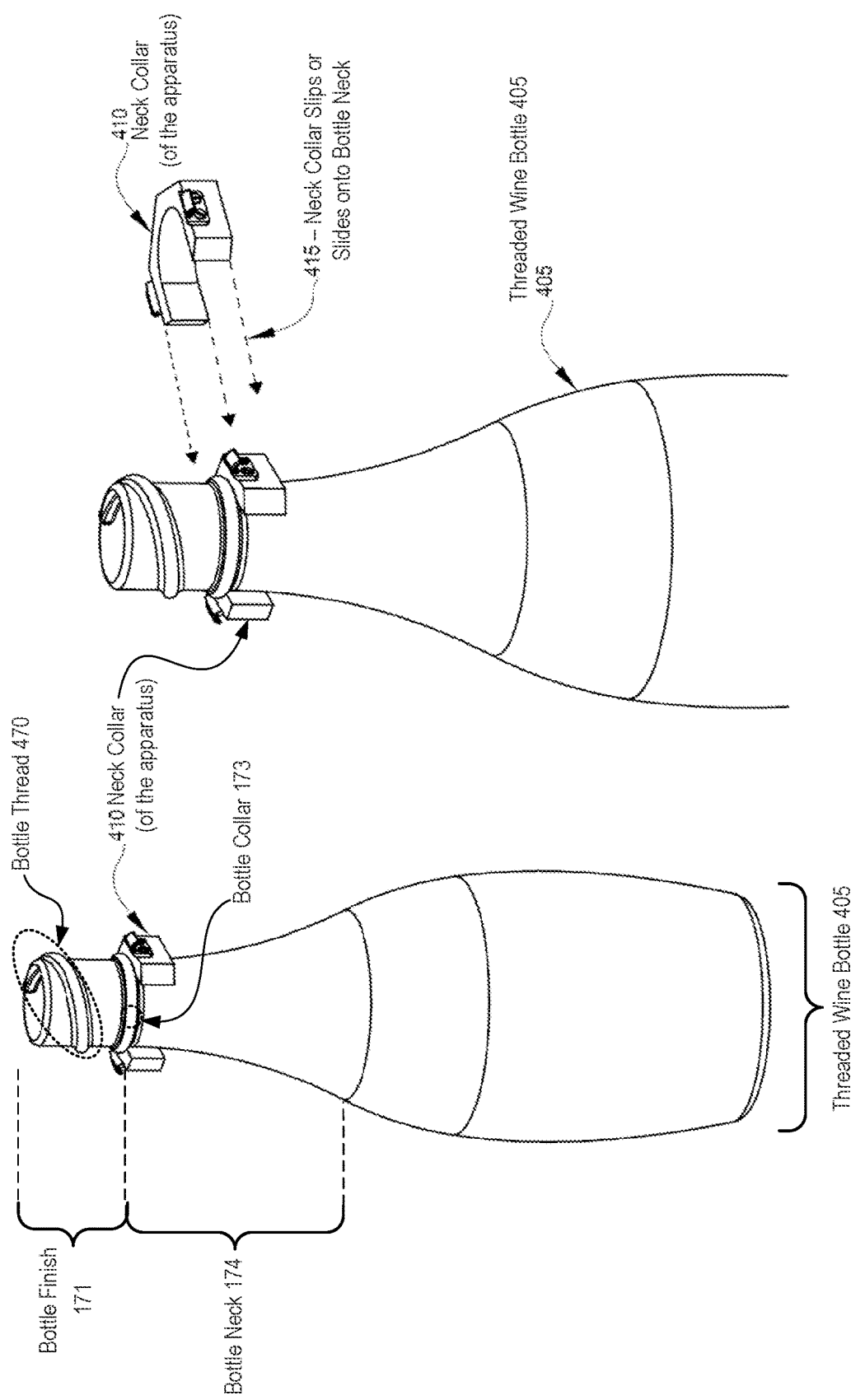
FIG. 4A depicts a threaded wine bottle having a threaded finish which is to receive the apparatus, in accordance with described embodiments.

FIG. 4A depicts a threaded wine bottle 405 having a threaded finish which is to receive the apparatus, in accordance with described embodiments.

In particular, it may be observed at the left-hand portion of the figure, a threaded wine bottle 405 having an anatomy with a bottle finish 171 and a bottle neck 174. Notably, formed within the finish 171 of the wine bottle 405 are a bottle collar 173 at a lower portion of the bottle finish 171 and additionally a bottle thread 470 formed into an upper portion of the bottle finish 171. At the right-hand portion of the figure, it may be observed that a neck collar 410 of the apparatus is to be slipped or slid onto the bottle neck (element 415), thus positioning the neck collar 410 beneath the bottle thread 470 and specifically beneath and adjacent to the bottle collar 173 of the threaded wine bottle 405. The bottle thread 470 thus permits a threaded sealing cap to be twisted onto the threaded wine bottle 405.

Figure 4B:
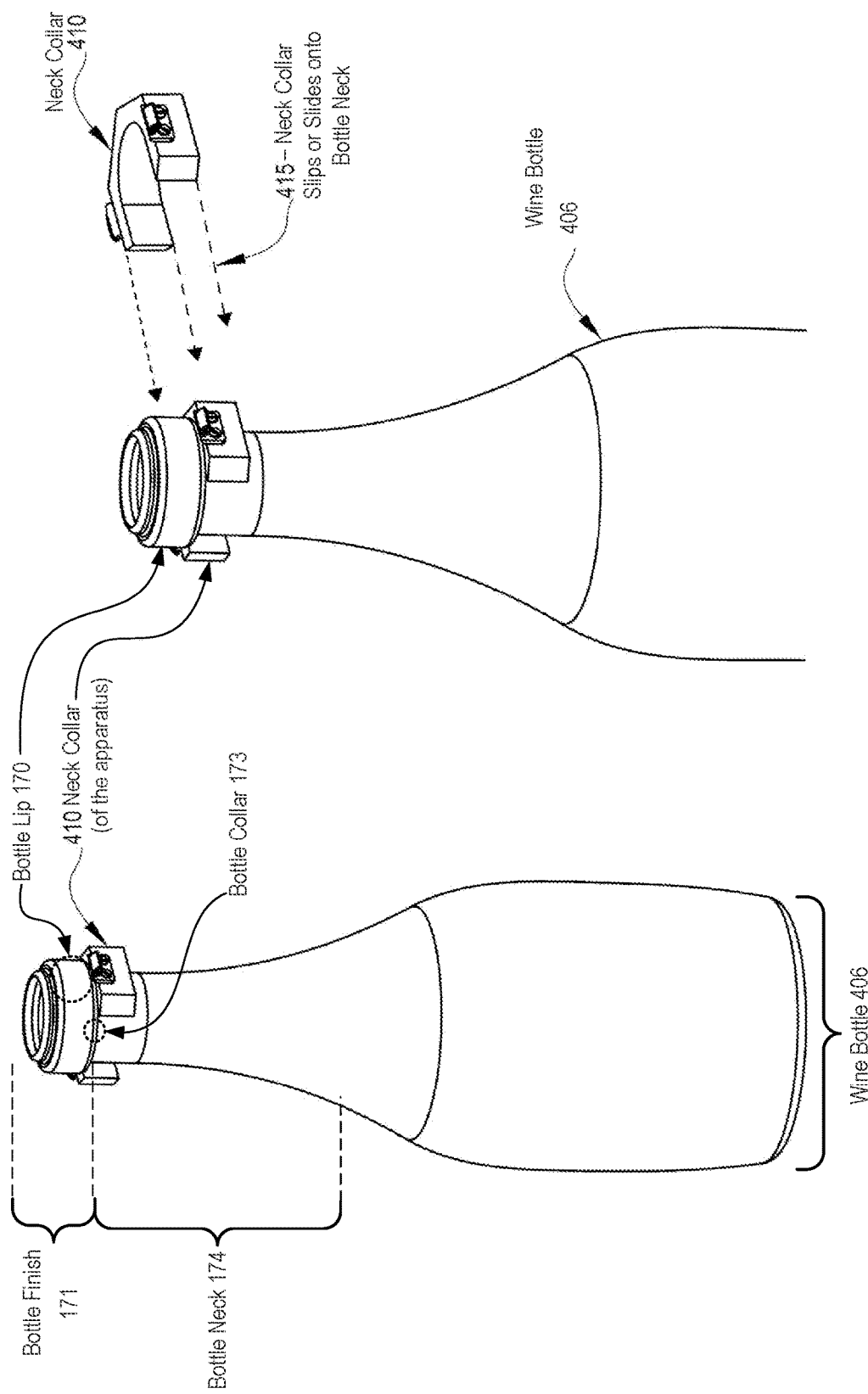
FIG. 4B depicts a wine bottle having a bottle lip formed into its finish, in which the wine bottle is to receive the apparatus, in accordance with described embodiments.

FIG. 4B depicts a wine bottle 406 having a bottle lip formed into its finish, in which the wine bottle 406 is to receive the apparatus, in accordance with described embodiments.

In particular, it may be observed at the left-hand portion of the figure, a wine bottle 406 having an anatomy with a bottle finish 171 and a bottle neck 174. Notably, formed within the finish 171 of the wine bottle 406 are a bottle collar 173 at a lower portion of the bottle finish 171 and additionally a bottle lip 170 formed into an upper portion of the bottle finish 171. Although such a wine bottle 406 lacks any threads, it may nevertheless be capped or corked, so as to seal in its contents.

Further depicted is a neck collar 410 of the apparatus that is to be slipped or slid onto the bottle neck (element 415), thus positioning the neck collar 410 beneath the bottle lip 170 470 and specifically beneath and adjacent to the bottle collar 173 of the wine bottle 406.

Figure 4C:
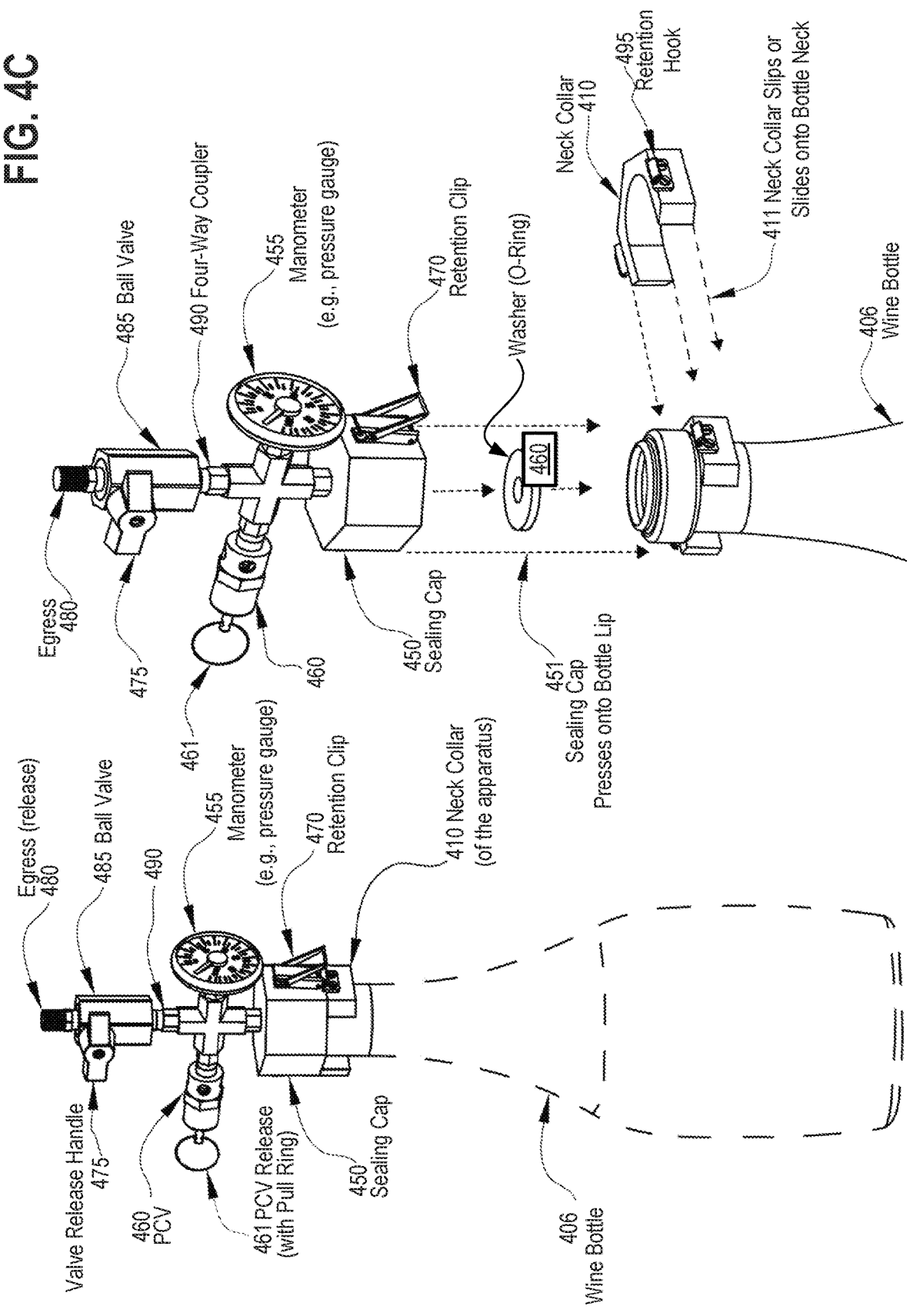
FIG. 4C depicts a wine bottle being attached to the apparatus, in accordance with described embodiments.

FIG. 4C depicts a wine bottle 406 being attached to the apparatus, in accordance with described embodiments.

In particular, it may be observed at the left-hand portion of the figure, a wine bottle 406 having been attached to the apparatus, and specifically, the sealing cap 450 of the apparatus having been placed atop the wine bottle 406 and coupled with the neck collar 410 of the apparatus which is positioned beneath the lip and collar of the wine bottle 406.

As shown at the right-hand side of the diagram, the sealing cap 450 presses onto the bottle lip (see element 451) and the retention clips 470 retain the sealing cap 405 and neck collar 410 in position with a compressive force upon the washer 460 by which to seal in any contents and pressure internal to the wine bottle 406. The sealing cap 450 is attached with a four-way coupler 490 which in turn is connected with each of the manometer 455, the ball valve 485, and the PCV 460. Pressure and contents may be released from the wine bottle 406 via the egress 480 of the ball valve 485 which is operated by the valve release handle 475 or alternatively, pressure may be automatically or manually released from the wine bottle 406 through the PCV through an automatic release at a pre-determined pressure for the PCV or manually via the PCV release's 461 pull ring.

Figure 4D:
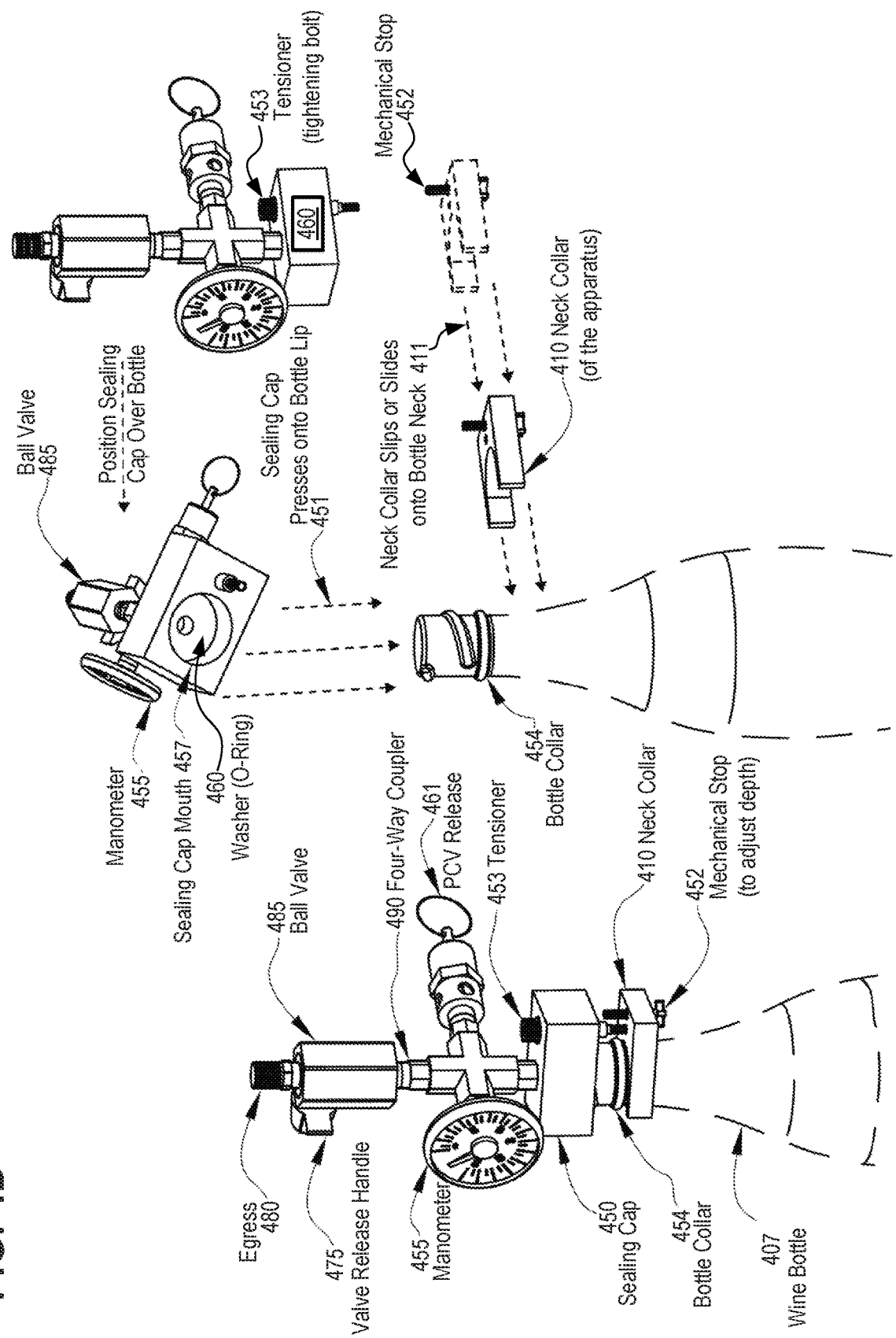
FIG. 4D depicts a wine bottle being attached to another variation of the apparatus, in accordance with described embodiments.

FIG. 4D depicts a wine bottle 407 being attached to another variation of the apparatus, in accordance with described embodiments.

Here, an alternative apparatus is depicted which foregoes the retention clips and instead utilizes a tensioner 453 (e.g., a tightening bolt) and mechanical stop 452 by which to attach the sealing cap 450 to the wine bottle 407 in a fixed and controlled position.

In particular, it may be observed at the left-hand portion of the figure, a wine bottle 407 having been attached to the apparatus, and specifically, the sealing cap 450 of the apparatus having been placed atop the wine bottle 406 and coupled with the neck collar 410 of the apparatus which is positioned beneath the lip and collar of the wine bottle 406.

Note that the wine bottle 407 may be a non-threaded type with a bottle lip or a threaded type with a threaded finish. Regardless of the type of the wine bottle 407 utilized, the sealing cap is placed atop the wine bottle 407 or pressed onto the bottle lip (element 451) so as to orient the mouth or opening of the wine bottle 407 into the sealing cap mouth 457 of the apparatus against the washer 460. The neck collar is further positioned onto the neck of the wine bottle 407 beneath the wine bottle's collar 454 by sliding or slipping the neck collar 410 onto the bottle neck as depicted by element 411.

With the sealing cap 450 and the neck collar 410 in position upon the wine bottle 407, the tensioner which is oriented upon the sealing cap may then be turned or rotated, causing the tensioner to thread into pre-formed threads within the neck collar 410, thus causing the sealing cap 450 and the neck collar 410 to move towards one another with a clamping force induced by the tensioner 453. The tensioner may be tightened until the bottom surface of the sealing cap 450 comes into contact with the mechanical stop 452 integrated into the neck collar, which is utilized to adjust the depth to which the sealing cap 450 is clamped onto the wine bottle 407, and thus, to indirectly control the clamping force induced into the coupling of the sealing cap 450 and the neck collar 410 by the tensioner 453. Once the sealing cap 450 and the neck collar 410 are coupled together and held in position via the clamping force induced by the tensioner 453, any contents and pressures within the wine bottle 407 will be sealed with the aid compressive force placed upon the washer 460.

FIG. 4E depicts a wine bottle 408 being attached to another variation of the apparatus, in accordance with described embodiments.

Here, an alternative apparatus is depicted which utilizes springs 478 and a spring tensioner 479 rather than the retention clips or clamping tensioner 453, in which the load induced into the springs 478 is to attach the sealing cap 450 to the wine bottle 408 in a fixed position.

In particular, it may be observed at the left-hand side of the diagram that the sealing cap 450 of the apparatus presses onto the bottle lip 451 and the neck collar slips or slides onto the neck of the bottle (see element 411).

Once the sealing cap 450 and the neck collar 410 are in position, as depicted at the right-hand side of the diagram, the spring tensioner 479 is utilized to apply a load into the springs 478 by moving the spring tensioner downward (see element 476). The springs 478 initially are not under load but induce a compressive force against the sealing cap and the mouth of the wine bottle 408 due to the springs 478, now under load, pulling the neck collar 410 toward the sealing cap 450 via the springs 478 which attach to the sealing cap at the retention hooks 477, thus pressing the wine bottle 408 into the sealing cap 450 and sealing in any contents and pressure internal to the wine bottle.

Figure 5A:
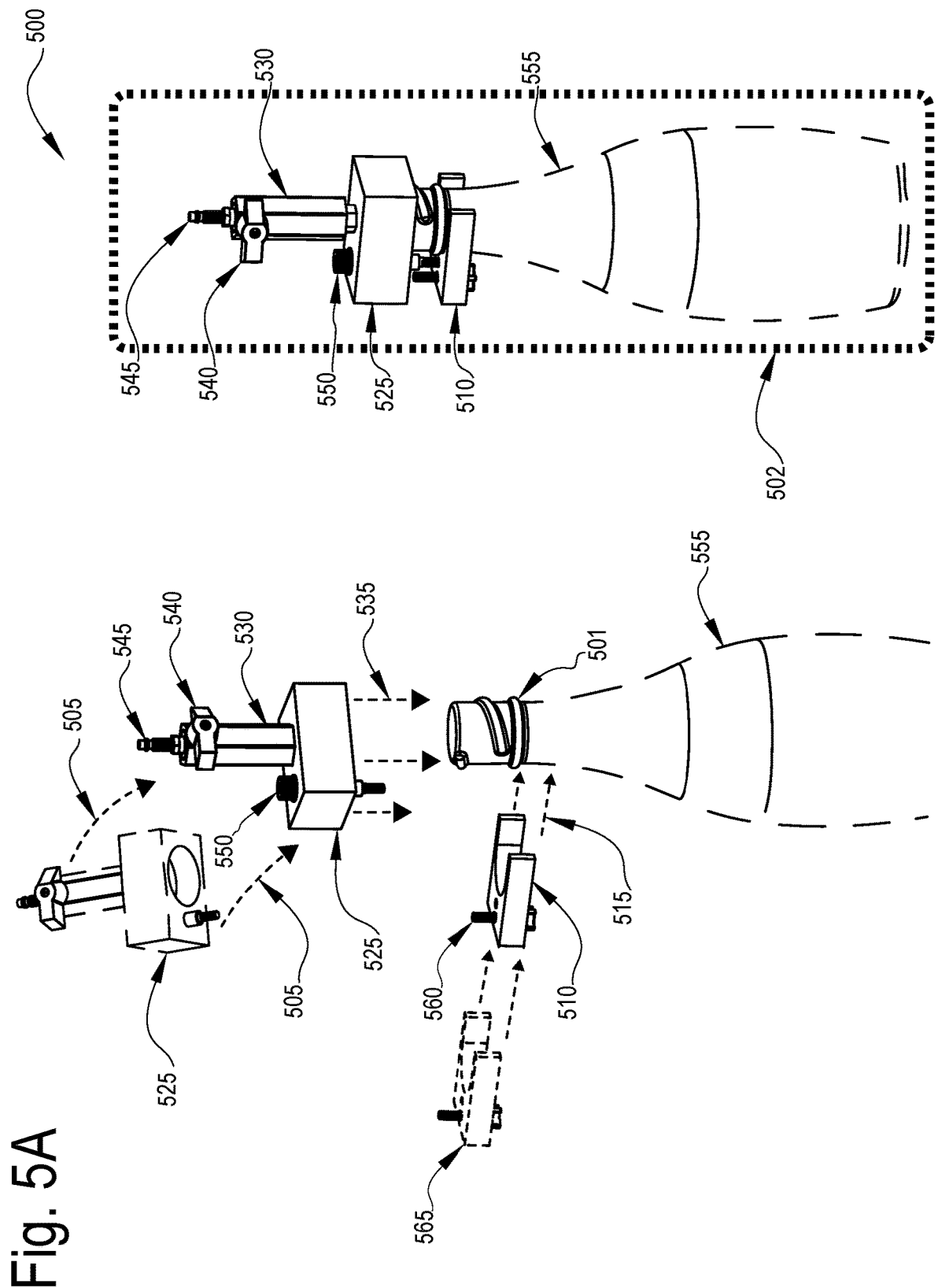
FIGS. 5A, 5B, 5C, and 5D depict alternative variations of the sealing cap configured with a quick connect end of ball valve, in accordance with described embodiments.

FIG. 5A depicts an alternative variation 500 of the sealing cap 525 configured with a quick connect end 545 of ball valve 540, in accordance with described embodiments.

As depicted here, there is again the wine bottle 555 having a collar 501 or lip of the wine bottle 555 below which the neck collar 510 of the apparatus is to be placed, as demonstrated by element 565 showing the neck collar in a removed position and being oriented upon the wine bottle 555 beneath the lip or collar 501 of the wine bottle by element 515.

As before, the mechanical stop 560 and tensioner 550 are shown, which permit the sealing cap 525 to be coupled with and fixed to the wine bottle 555 by operating in conjunction with the neck collar 510 as described above, in which the sealing cap 525 is oriented from a removed position (see element 505) onto the wine bottle 555 by pressing, twisting, or pressing the sealing cap 525 onto the wine bottle 555 and onto a lip or the threads of the wine bottle 555, as depicted by the downward arrows at element 535, resulting in the coupled configuration of the sealing cap 525 onto the wine bottle 555 as shown via the inset box 502 on the right hand side of the diagram.

Note, however, that the sealing cap 520 is now configured with a quick connect (and quick disconnect) end 545 of the ball valve 540, permitting other sub-components of the apparatus to be quickly coupled and de-coupled from the ball valve 540. Specifically shown here is a male quick connect and quick disconnect end capable to mechanically interface and couple with a complementary female quick connect and quick disconnect end, however other configurations are permissible. Additionally, the quick disconnect ends (male and female) may be of a pneumatic quick connect and quick disconnect type, a hydraulic quick connect and quick disconnect type, or air-hose, water, or gas type fittings, depending on the implementation and configuration desired by the user.

The ball valve 540 is then coupled with the sealing cap 525 via an egress/ingress port of the ball valve 540 (e.g., such as a threaded port, etc.) or the ball valve 540 may be coupled with the sealing cap 525 via a 2-way coupler 530 as shown here, rather than a 3-way or 4-way coupler (e.g., refer to the alternative 4-way coupler 705 at FIG. 7B), thus having the ball valve 540 positioned between the quick connect end 545 and the 2-way coupler 530, as is shown in this alternative variant of the apparatus, which presently (according to FIG. 5A) is not coupled with either the manometer or PCV valve of the apparatus.

Regardless of the connection and coupler types, a continuous sealed path is formed from a first end of the ball valve 540 and its quick connect end 545 through the sealing cap 525 and into the wine bottle 555.

Figure 5B:
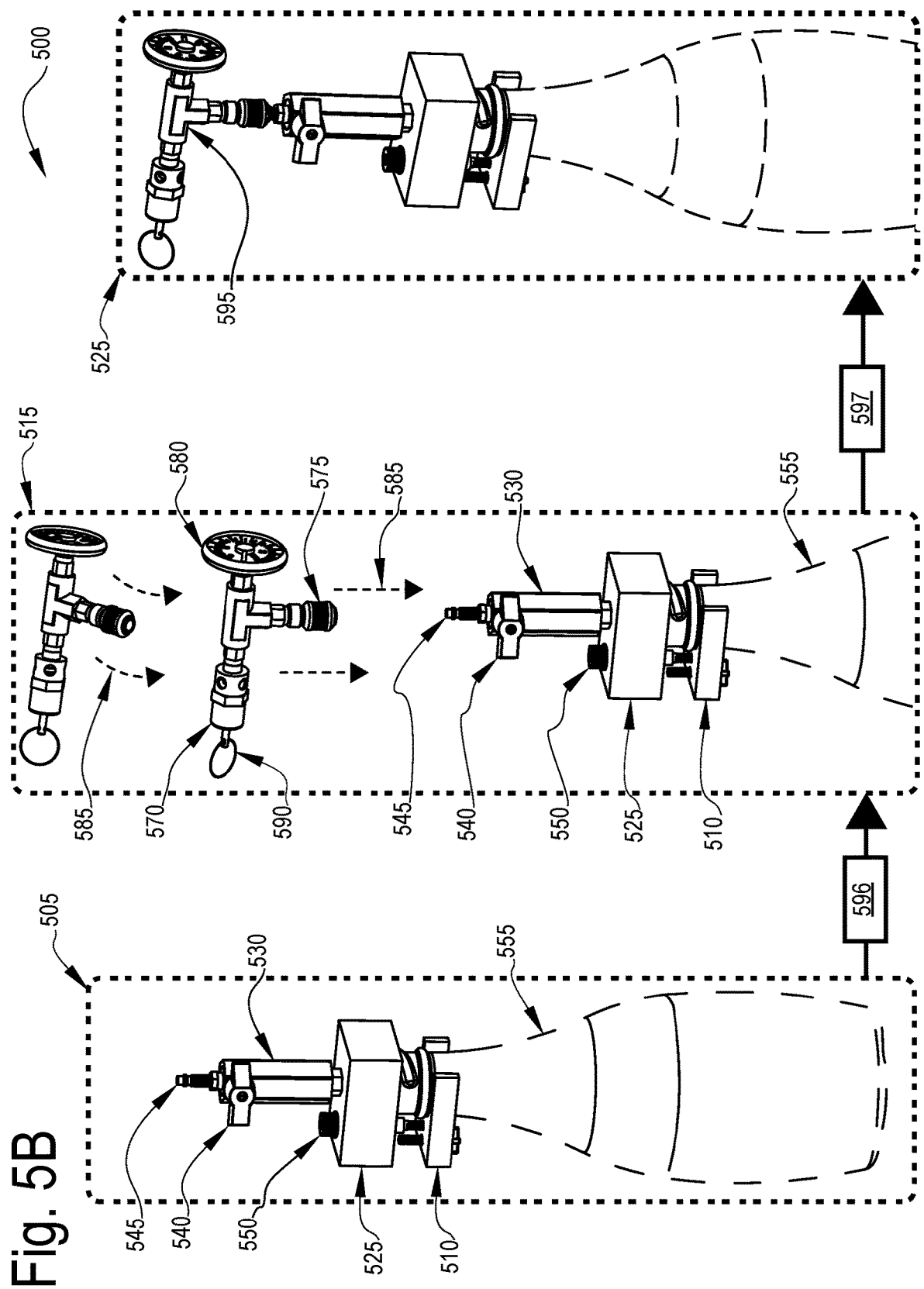

FIG. 5B depicts further details of the alternative variation 500 of the sealing cap 525 configured with a quick connect end 545 of ball valve 540, in accordance with described embodiments.

More particularly, there is depicted here a flow of operations presented via the migration between the three inset boxes (505 on the left, 515 in the middle, and 525 on the right) which advance from left to right as depicted by the progression arrows 596 and 597. The inset box 505 at the left hand side of FIG. 5B is the same as inset box 502 at the right hand side of FIG. 5A.

Further depicted here is a three-way coupler 595 which has a PCV 570 coupled with a first egress port of the three-way coupler 595 and a manometer 580 coupled with a second egress port of the three-way coupler 595, and finally a complementary female quick connect and quick disconnect end coupled with the third and final end, or the third egress/ingress port of the three-way coupler 595. Thus, there is formed and depicted at inset box 515, a sub-component of the apparatus having the female quick connect and quick disconnect end 575, the manometer 580, and the PCV 570 (with its manual pressure release pull ring 590) all coupled with the three-way coupler 595.

With reference to inset box 505, once the sealing cap 525 has been coupled with the wine bottle 555, use and operation the apparatus thus advances to the configuration depicted at inset box 515, in which the female quick connect and quick disconnect end 575 is affixed to the sealing cap 525 already coupled with the wine bottle 555 by attaching (see the directional arrows at element 585) the female quick connect end 575 with the male quick connect end 545, thus resulting in the final configuration as is depicted at inset box 525.

Figure 5C:
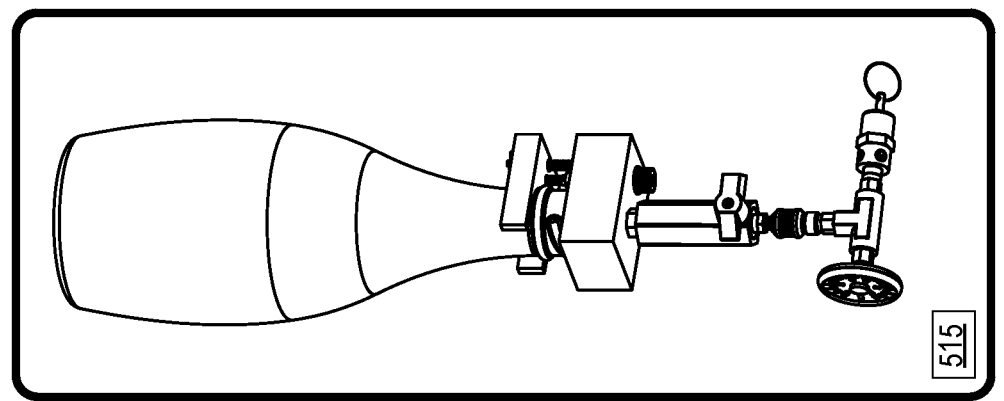

FIG. 5C depicts further details of the alternative variation 500 of the sealing cap 525 configured with a quick connect end 545 of ball valve 540, in accordance with described embodiments.

The inset box 510 depicted at the left hand side of the diagram is the same as the inset box 525 of FIG. 5B. Here, further use of the apparatus is shown via the progression arrow 505, in which the wine bottle is inverted, resulting in the configuration and orientation shown at inset box 515. As described in detail above, inverting the wine bottle in this manner permits the sediment formed via the second fermentation process to fall to the bottom of the now inverted wine bottle, thus collecting into the neck portion of the inverted wine bottle. Notably, however, it is not necessary to freeze the neck portion of the wine bottle, although the contents may be cooled down to an above-freezing temperature to reduce pressure inside of the wine bottle.

In such a way, the apparatus is thus formed from its multiple sub-components including the manometer, the PCV, the ball valve, and sealing cap, which connect with the wine bottle via the neck collar of the apparatus, but may take on the alternative configuration of a top portion and bottom portion connectable and removable via the quick connect/disconnect male and female ends, as opposed to the apparatus being configured into its non-quick connect variant via the solid-built-4-way coupler as described above. Thus, the "top" portion may be configured via the 3-way and its manometer, PCV, and quick connect end (female or male) and the "bottom" portion may be configured via the sealing cap with the ball valve and a quick connect end (complementary to the female or male of the top portion).

Such an alternative configuration permits a system to be manufactured and sold with non-equal quantities of the bottom portion sealing caps and top portion PCV/manometer segments, while permitting the top and bottom portions to remain interchangeable. For instance, a manufacturer may sell a system with 10,000 bottom portions having sealing caps (and attached ball valves and quick disconnect ends) and then 5,000 or 2,000 of the top portions having the PCV/manometer sub-components, which are then attachable to the bottom portion at times during the sparkling winemaking process as determined by the winemaker, rather than requiring the manometer and PCV to be coupled with the wine bottle at all times during the secondary fermentation operation.

Such a system thus promotes efficiency and re-use of the components in a more optimized fashion as there is no longer a need for the PCV/manometer top portion subsequent to fermentation having completed, as may be determined by the winemaker from readings utilizing the attached manometer of the apparatus. The PCV is not needed as the internal pressures will remain steady after fermentation ends, thus eliminating the risk of an over-pressurized state inside of the wine bottle.

Moreover, removal of the top portion with the manometer/PCV protects the expensive components and also makes the riddling operation simpler due to the reduced size of the wine bottle and apparatus after removal of its top portion.

Figure 5D:
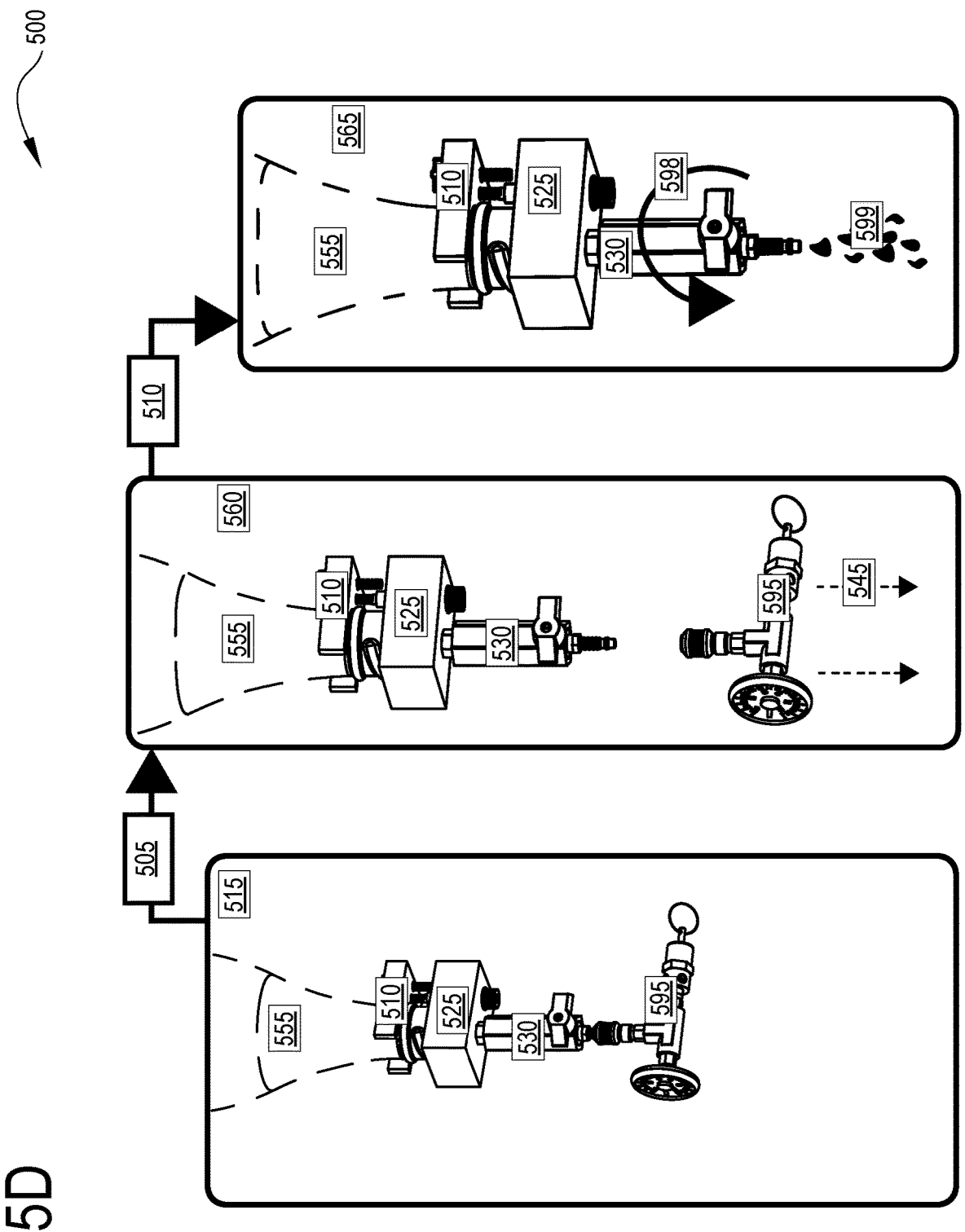

FIG. 5D depicts further details of the alternative variation 500 of the sealing cap 525 configured with a quick connect end 545 of ball valve 540, in accordance with described embodiments.

There is again depicted the inverted orientation of the wine bottle 535 at inset box 515 on the left hand side of the diagram, having the neck collar 510 of the apparatus, the sealing cap 525, and the ball valve and its coupler 530 now depicted as being joined and attached with the other sub-components of the apparatus, including the manometer and PCV, via the 3-way coupler 595, and more particularly, via the female quick connect end, as shown at inset box 515.

Further use advances to inset box 560 via progression arrow 505, in which the wine bottle 555 remains inverted and the three-way coupler 595 (having its manometer and PCV attached) is disconnected from the ball valve and sealing cap by disconnecting the female quick disconnect end from the male quick disconnect end, such as is depicted via the downward directional arrows at element 545.

Although the inverted orientation is shown here, three-way coupler 595 may be disconnected in any orientation, and at any time and re-connected in any orientation and at any time, simply by disconnecting or re-connecting the female and male quick connect/disconnect ends to one another.

For example, the winemaker may initiate the wine making process with the 3-way coupler 595 (having its manometer and PCV attached) engaged with the wine bottle 555 through the quick connect end and sealing cap, thus permitting pressure readings via the manometer and automatic pressure release and control via the PCV, and then disconnect the 3-way coupler 595 (having its manometer and PCV attached) during riddling. Alternatively, the winemaker may begin the wine making process with the 3-way coupler 595 (having its manometer and PCV attached) engaged with the wine bottle 555 and then remove the 3-way coupler at some point prior to riddling, such as when fermentation appears to near its completion or when the pressure inside of the bottle plateaus or ceases to rise or when a particular pressure reading is attained, etc. Alternatively, the winemaker may begin the second fermentation operation with the sealing cap attached to the wine bottle and without the 3-way coupler 595 (having its manometer and PCV attached) engaged with the wine bottle, and then subsequently attached the 3-way coupler 595 with the sealing cap via the quick connect.

The winemaker may elect to remove the 3-way coupler 595 (having its manometer and PCV attached) from the wine bottle's sealing cap so as to prevent the manometer from becoming obstructed or to re-use the 3-way coupler 595 (having its manometer and PCV attached) on a different wine bottle and different sealing cap, as the quick connect end permits the sealing cap and the 3-way coupler 595 (having its manometer and PCV attached) portions of the apparatus to be interchangeable with ease.

Regardless of the timing or the precise order of the removal and attachment of the 3-way coupler 595 (having its manometer and PCV attached), ultimately the riddling process is performed by inverting the wine bottle and permitting the sediment to accumulate within the neck portion of the inverted wine bottle. When ready, the winemaker may then proceed to evacuate the sediment (lees) from the wine bottle in the manner depicted by inset box 565, in which the knob or handle of the ball valve is rotated (see element 598), thus opening the ball valve which is no longer connected with the 3-way coupler 595 (having its manometer and PCV attached), thus permitting the sediment to evacuate from the wine bottle 555 through the sealing cap 525 and through the ball valve (and its 2-way coupler 530 or other attaching component), thus resulting in the sediment leaving the wine bottle and apparatus under pressure, as depicted at element 599. Again, there is no need to freeze the sediment into the neck portion of the wine bottle 555 as the inverted wine bottle 555 shown here is in a proper orientation to complete the riddling process without freezing, simply by evacuating the sediment from the wine bottle in its inverted position with the opening of the ball valve and then the re-closing of the ball valve when the lees is removed (e.g., when the winemaker judges the contents to run clear or more translucent), thus finalizing the operation of removing the sediment while conserving a maximum amount of product and contents inside of the wine bottle.

The wine bottle may then be reduced in temperature to a cooler but above-freezing state, the sealing cap removed from the wine bottle 555, and the wine bottle then corked or sealed with its finishing cork, labeled, packaged, and shipped for distribution.

It is therefore in accordance with a particular embodiment, that the method and flow operations described above with reference to FIGS. 5A through 5D, include a method for producing carbonated beverages within a glass beverage bottle via a fermentation process initiated upon the introduction of yeast and sugar into the glass beverage bottle with a base beverage and sealed into the glass beverage bottle via a removable apparatus. According to such embodiments, the exemplary method includes at least a sub-set of the following operations, including: injecting the base beverage into the glass beverage bottle; injecting the yeast and the sugar into the glass beverage bottle; attaching the removable apparatus to the glass beverage bottle to seal in any pressure generated by the fermentation process into the glass beverage bottle. According to this particular embodiment, the attaching operation includes at least: positioning a neck collar of the removable apparatus upon a neck section of the glass beverage bottle; positioning a sealing cap of the removable apparatus atop a mouth opening of the glass beverage bottle above the neck collar; attaching the sealing cap to the neck collar; and tightening the sealing cap against the mouth opening of the glass beverage bottle.

For example the sealing cap may be tightened via a tensioner which thus in turn induces a clamping force between the neck collar of the removable apparatus positioned upon the neck section of the glass beverage bottle and the sealing cap of the removable apparatus positioned atop the mouth opening of the glass beverage bottle to seal the pressure generated from the fermentation operation into the glass beverage bottle. In such an embodiment, the tightening of the sealing cap against the mouth opening of the glass beverage bottle may further include the turning of a tensioner bolt positioned through the sealing cap and threaded into a threaded orifice of the neck collar to thread the tensioner bolt further into the threaded orifice of the neck collar and retracting the sealing cap of toward the neck collar of the removable apparatus and against the mouth opening of the glass beverage bottle.

Such an embodiment may further include measuring the pressure internal to the glass beverage bottle via a pressure indicator coupled with the removable apparatus and displaying the measured pressure via the pressure indicator; retaining the pressure internal to the glass beverage bottle via a Pressure Reduction Valve (PRV) coupled with the removable apparatus configured to limit the pressure inside of the glass beverage bottle to a pre-determined maximum pressure limit; and evacuating sediment from the neck section of the glass beverage bottle when the glass beverage bottle is in an inverted position by the opening of a ball valve coupled with the removal apparatus without requiring freezing of the neck section of the glass beverage bottle.

Figure 6:
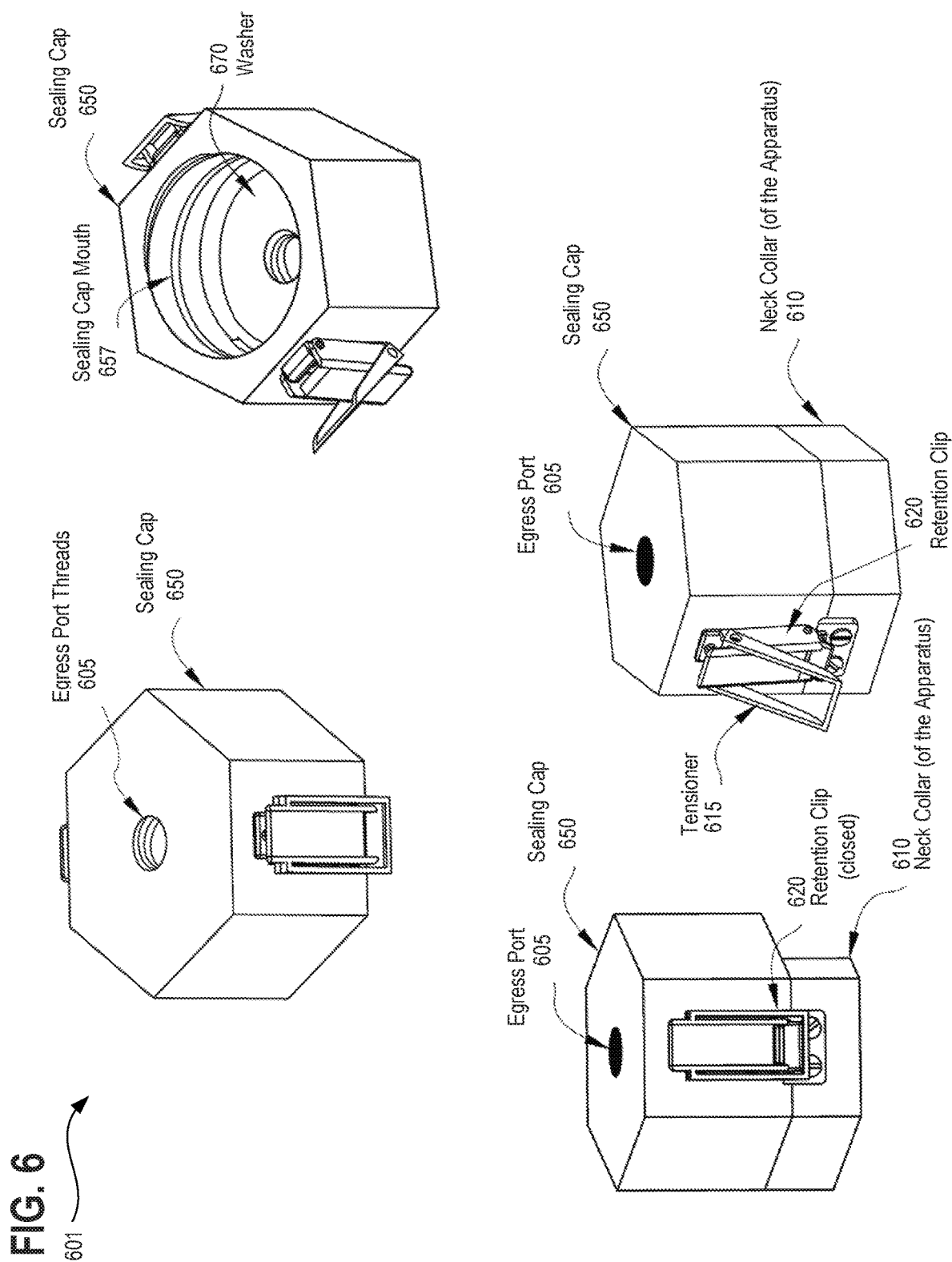
FIG. 6 depicts the sealing cap of the apparatus in greater detail, in accordance with described embodiments.

FIG. 6 depicts the sealing cap 650 of the apparatus in greater detail 601, in accordance with described embodiments.

In particular, at the topmost portion of the diagram, there is a sealing cap 650 showing the egress port threads 605 by which the sealing cap 650 is to attach to the four-way coupler. Additionally depicted are the sealing cap mouth 657 and the washer 670 of the sealing cap.

At the lower portion of the diagram, there is further depicted the sealing cap 650 having been coupled with the neck collar of the apparatus and affixed under tension via the retention clip 620, shown in its closed position on the lower left and in its opened position on the lower right. The tensioner 615 of the retention clip operates as a lever via which to clasp the retention clip to the retention hook, under force.

Figure 7A:
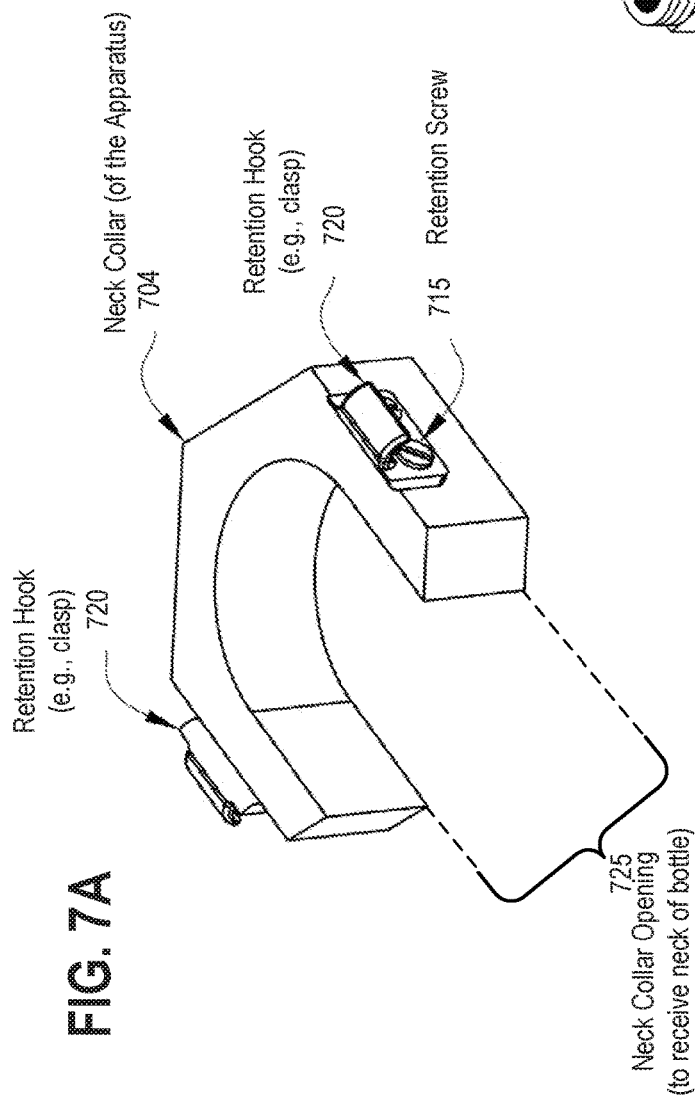
FIG. 7A depicts the neck collar of the apparatus in greater detail, in accordance with described embodiments.

FIG. 7A depicts the neck collar 704 of the apparatus in greater detail, in accordance with described embodiments.

Notably, there is depicted here the neck collar opening 725 which is to receive the neck of the wine bottle. The neck collar opening 725 has an interior diameter greater than that of the neck of the wine bottle and less than that of the collar and lip of the wine bottle. Further shown are the retention hook (e.g., clasp) 720 and retention screws 715 by which the retention clips affixed to the sealing cap may couple with the neck collar under a compressive force to seal in contents and pressures of the wine bottle.

Figure 7B:
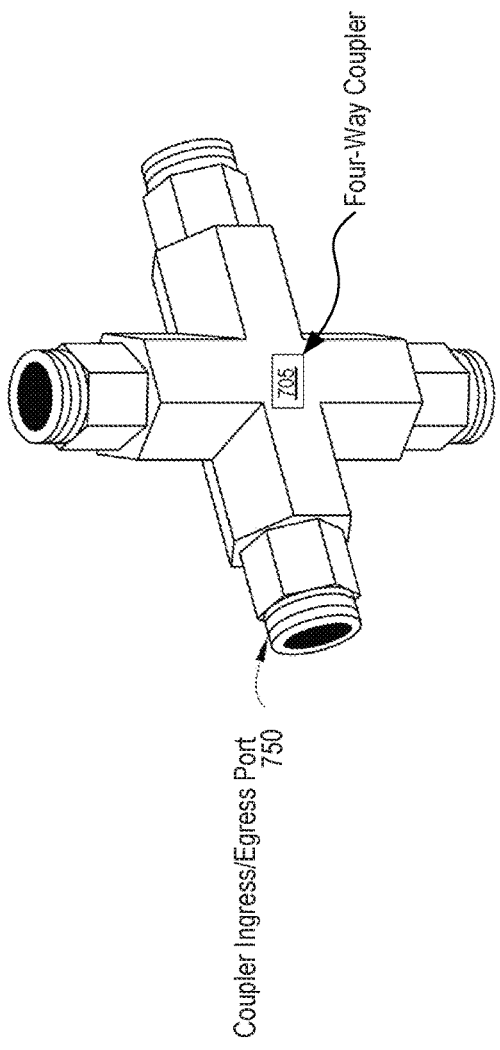
FIG. 7B depicts the four-way coupler of the apparatus, including the coupler ingress and egress ports, in accordance with described embodiments.

FIG. 7B depicts the four-way coupler 705 of the apparatus, including the coupler ingress and egress ports 750, in accordance with described embodiments.

Although not shown here, it is possible to configure the apparatus without a manometer by simply utilizing a three-way coupler, or without a PCV, also through the use of a three-way coupler, or without either a manometer or a PCV, through the use of a two-way coupler which attaches the sealing cap with a ball valve, although such configurations are less preferred.

FIG. 8 depicts the manometer 815 of the apparatus in greater detail 801, in accordance with described embodiments.

As shown here, the manometer 815 has a connection port 845 within the gauge housing via which to attached with the four-way coupler. Additionally depicted are the dial scale indicator 835, the indicator hand 830, and the gauge face or cover 820.

Figure 9:
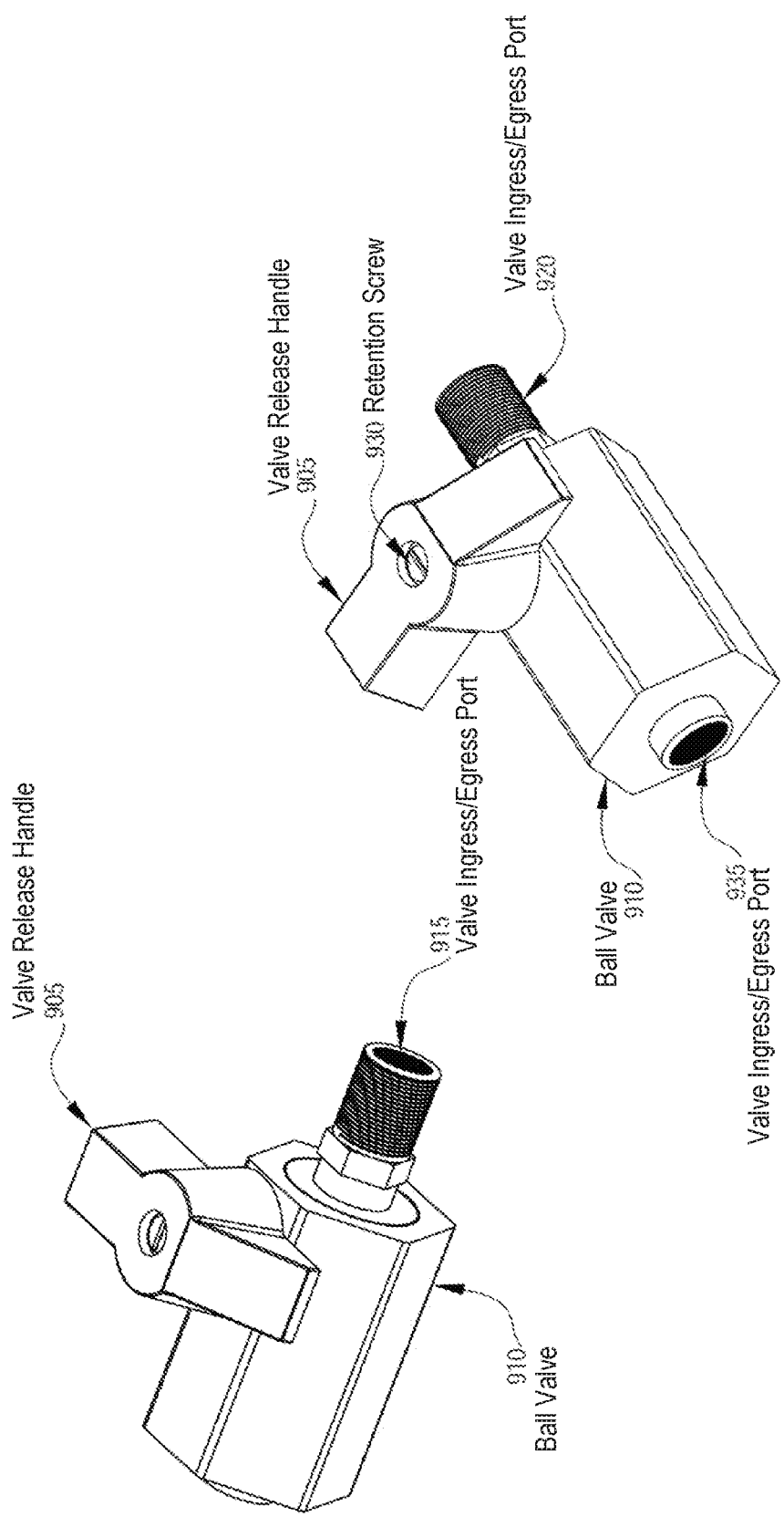
FIG. 9 depicts the ball valve of the apparatus in greater detail, in accordance with described embodiments.

FIG. 9 depicts the ball valve 910 of the apparatus in greater detail 901, in accordance with described embodiments.

As shown here, the ball valve 910 includes a valve release handle 905 (and retention screw 930) as well as valve ingress and egress ports 920 and 935.

Although not shown here, it is possible to use alternative types of control valves, such as gate valves, globe valves, plug valves, butterfly valves, check valves, diaphragm valves, pinch valves, or even a second pressure control valve, pressure relief valve, or pressure reduction valve, etc. However, the ball valve is depicted and contemplated for use due to its simplicity and resilience.

FIG. 10 depicts the pressure control valve (PCV) of the apparatus in greater detail 1001, in accordance with described embodiments.

As shown here, the PCV 1005 includes a connection port 1030, multiple release ports 1025, a release pin 1015 a manual pull ring 1020, and a drive surface via which to tighten or torque the threads of the PCV onto the four-way coupler. A pressure relief valve or a pressure reducing valve may also be utilized.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system for production of sparkling wine, the system comprising:
   a wine bottle within which to ferment a base wine into the sparkling wine via a secondary fermentation operation initiated when yeast and sugar are introduced into the wine bottle;
   a removable apparatus to be coupled with the wine bottle to seal any pressure generated via the secondary fermentation operation into the wine bottle;
   the removable apparatus formed from at least:
   a neck collar to be positioned upon a neck section of the wine bottle;
   a sealing cap to be positioned atop a mouth opening of the wine bottle above the neck collar;
   a coupling mechanism to attach the sealing cap with the neck collar and to induce compressive force between the sealing cap and the mouth opening of the wine bottle to seal the pressure generated via the secondary fermentation operation into the wine bottle at the mouth opening;
   a tensioner of the removable apparatus which operates to induce the compressive force between the sealing cap and the mouth opening of the wine bottle by inducing a clamping force between the neck collar of the removable apparatus positioned upon the neck section of the wine bottle and the sealing cap of the removable apparatus positioned atop the mouth opening of the wine bottle;
   a ball valve affixed to the sealing cap through a coupler to evacuate contents from the wine bottle;
   a Pressure Reduction Valve (PRV) to limit the pressure inside of the wine bottle to a pre-determined maximum pressure limit;
   a pressure indicator to measure and display the pressure internal to the wine bottle generated via the secondary fermentation operation; and
   wherein the removable apparatus is configurable to evacuate sediment from the neck section of the wine bottle when the wine bottle is in an inverted orientation by opening of the ball valve without requiring freezing of the neck section of the wine bottle.

2. The system of claim 1, wherein the tensioner comprises:
   a tensioner bolt positioned through the sealing cap and threaded into a threaded orifice of the neck collar, wherein the tensioner bolt is rotated to thread the tensioner bolt further into the threaded orifice of the neck collar to induce a clamping force between the neck collar and the sealing cap of the removable apparatus.

3. The system of claim 1, wherein the tensioner comprises one of:

multiple retention clips attached to the sealing cap configurable to lever closed and pull against retention clasps affixed to the neck collar; or a spring tensioner attached to the neck collar of the removable apparatus configurable to lever downward to apply a load into springs attached to the spring tensioner, wherein the springs are attached with the spring tensioner at a first end of each spring and are further attached to retention hooks of the sealing cap at a second end of each of the springs.

4. The system of claim 1:

wherein the neck collar of the removable apparatus is retained upon the neck section of the wine bottle via a collar of the wine bottle integrated within a finish section of the wine bottle beneath a lip or threads of the wine bottle;

wherein an opening of the neck collar of the removable apparatus has an orifice size greater than a diameter of the neck section of the wine bottle and lesser than a diameter of the collar of the wine bottle which retains the neck collar in position; and wherein the neck collar of the removable apparatus is prevented from moving higher up the neck section of the wine bottle via the collar of the wine bottle.

5. The system of claim 1:

wherein the removable apparatus is formed from a top portion and a bottom portion to be joined via complementary quick connect and quick disconnect ends;

wherein the top portion includes a 3-way coupler to join the PRV and the pressure indicator with a first quick connect end;

wherein the bottom portion includes sealing cap coupled with the ball valve and coupled with a second quick connect end complementary to the first quick connect end; and wherein the top portion and the bottom portion are joinable by connecting the first and second quick connect ends together.

6. The system of claim 5:

wherein the first quick connect end comprises a female pneumatic quick connect end;

wherein the second quick connect end comprises a male pneumatic quick connect end;

wherein the female pneumatic quick connect end is to receive the male pneumatic quick connect end to join the top portion of the removable apparatus with the bottom portion of the removable apparatus without removing the sealing cap from the wine bottle.

7. The system of claim 6:

wherein the first quick connect end comprises a female pneumatic quick connect-disconnect coupler;

wherein the second quick connect end comprises a male pneumatic quick connect-disconnect coupler;

wherein the top portion of the removable apparatus is detachable from the sealing cap and wine bottle without releasing the pressure or contents from the wine bottle by disengaging the female pneumatic quick connect-disconnect coupler from the male pneumatic quick connect-disconnect coupler; and wherein the sealing cap of the bottom portion of the removable apparatus remains attached to the wine bottle via the coupling mechanism attaching the sealing cap to the neck collar.

8. The system of claim 1, wherein the pressure indicator comprises one of:

a manometer and pressure display;

a pressure gauge and pressure display;

a vacuum meter and pressure display;

a pressure gauge and pressure display; or a pressure sensor and pressure display; and wherein the pressure indicator is to measure the pressure inside of the wine bottle and display the pressure measured via the pressure display.

9. The system of claim 1, wherein the PRV comprises one of:

an automatic pressure reduction valve;

an automatic pressure relief valve; or an automatic pressure control valve; and wherein the PRV is to automatically release at least a portion of the pressure from the wine bottle upon the PRV attaining the pre-determined maximum pressure limit for the PRV.

10. The system of claim 1, further comprising:

a gasket, washer, O-ring, or seal positioned within an opening of the sealing cap;

wherein the opening of the sealing cap is to receive the mouth opening of the wine bottle and orient the gasket, washer, O-ring, or seal against the mouth opening of the wine bottle against an exposed surface of the gasket, washer, O-ring, or seal; and wherein the coupling mechanism, when attached to the sealing cap, seals the pressure into the wine bottle by inducing a compressive force through the gasket, washer, O-ring, or seal oriented between the opening of the sealing cap and the mouth opening of the wine bottle.

11. The system of claim 1, wherein the sealing cap comprises on opening to receive the mouth opening of the wine bottle by one of:

pressing the sealing cap onto a lip within a finish portion of the wine bottle;

threading the sealing cap onto threads of the finish portion of the wine bottle; and pressing the sealing cap over the threads of the wine bottle and mating a gasket, washer, O-ring, or seal oriented within the opening of the sealing cap to the mouth opening of the wine bottle.

12. The system of claim 1:

wherein the yeast and the sugar are introduced into the wine bottle to initiate the secondary fermentation operation prior to attaching the removable apparatus to the wine bottle; or alternatively wherein the yeast and the sugar are injected into the wine bottle through the sealing cap of the removable apparatus to initiate the secondary fermentation operation subsequent to attaching the removable apparatus to the wine bottle.

13. An apparatus to attach with a glass beverage bottle for production of carbonated beverages within the glass beverage bottle via a fermentation process initiated upon introduction of yeast and sugar into the glass beverage bottle with a base beverage, wherein the apparatus comprises:

a neck collar to be positioned upon a neck section of the glass beverage bottle;

a sealing cap to be positioned atop a mouth opening of the glass beverage bottle above the neck collar, wherein the sealing cap is to seal any pressure generated via the fermentation operation into the glass beverage bottle;

a coupling mechanism to attach the sealing cap with the neck collar and to induce compressive force between the sealing cap and the mouth opening of the glass beverage bottle to seal the pressure generated via the fermentation operation into the glass beverage bottle;

a tensioner to induce the compressive force between the sealing cap and the mouth opening of the wine bottle by inducing a clamping force between the neck collar of the apparatus positioned upon the neck section of the wine bottle and the sealing cap of the apparatus positioned atop the mouth opening of the wine bottle;

a ball valve affixed to the sealing cap through a coupler to evacuate contents from the glass beverage bottle;

a Pressure Reduction Valve (PRV) to limit the pressure inside of the glass beverage bottle to a pre-determined maximum pressure limit;

a pressure indicator to measure and display the pressure internal to the glass beverage bottle generated via the fermentation operation; and wherein the apparatus is configurable to evacuate sediment from the neck section of the glass beverage bottle when the glass beverage bottle is in an inverted orientation by opening of the ball valve without requiring freezing of the neck section of the glass beverage bottle.

14. The apparatus of claim 13, wherein the glass beverage bottle comprises one of:
a wine bottle;
a sparkling wine bottle;
a champagne bottle;
a beer bottle; and
wherein the base beverage comprises one of (i) beer recipe ingredients or (ii) previously fermented base wine to undergo a secondary fermentation into sparkling wine.

15. The apparatus of claim 13:
wherein the apparatus is formed from a top portion and a bottom portion to be joined via complementary quick connect and quick disconnect ends;
wherein the top portion includes a 3-way coupler to join the PRV and the pressure indicator with a first quick connect end;
wherein the bottom portion includes sealing cap coupled with the ball valve and coupled with a second quick connect end complementary to the first quick connect end; and
wherein the top portion and the bottom portion are joinable by connecting the first and second quick connect ends together.

16. The apparatus of claim 15:
wherein the first quick connect end comprises a female pneumatic quick connect end;
wherein the second quick connect end comprises a male pneumatic quick connect end;
wherein the female pneumatic quick connect end is to receive the male pneumatic quick connect end to join the top portion of the apparatus with the bottom portion of the apparatus without removing the sealing cap from the glass beverage bottle.

17. The apparatus of claim 15:
wherein the first quick connect end comprises a female pneumatic quick connect-disconnect coupler;
wherein the second quick connect end comprises a male pneumatic quick connect-disconnect coupler;
wherein the top portion of the apparatus is detachable from the sealing cap and from the glass beverage bottle without releasing the pressure or contents from the glass beverage bottle by disengaging the female pneumatic quick connect-disconnect coupler from the male pneumatic quick connect-disconnect coupler; and
wherein the sealing cap of the bottom portion of the apparatus is configurable to remain attached to the glass beverage bottle via the coupling mechanism attaching the sealing cap to the neck collar.

18. A method for producing carbonated beverages within a glass beverage bottle via a fermentation process initiated upon introduction of yeast and sugar into the glass beverage bottle with a base beverage and sealed into the glass beverage bottle via a removable apparatus, wherein the method comprises:
injecting the base beverage into the glass beverage bottle;
injecting the yeast and the sugar into the glass beverage bottle;
attaching the removable apparatus to the glass beverage bottle to seal in any pressure generated by the fermentation process into the glass beverage bottle;
wherein the attaching includes at least a plurality of operations including:
positioning a neck collar of the removable apparatus upon a neck section of the glass beverage bottle;
positioning a sealing cap of the removable apparatus atop a mouth opening of the glass beverage bottle above the neck collar;
attaching the sealing cap to the neck collar;
tightening the sealing cap against the mouth opening of the glass beverage bottle via a tensioner and inducing a clamping force between the neck collar of the removable apparatus positioned upon the neck section of the glass beverage bottle and the sealing cap of the removable apparatus positioned atop the mouth opening of the glass beverage bottle to seal the pressure generated from the fermentation operation into the glass beverage bottle;
wherein the tightening of the sealing cap against the mouth opening of the glass beverage bottle comprises turning a tensioner bolt positioned through the sealing cap and threaded into a threaded orifice of the neck collar to thread the tensioner bolt further into the threaded orifice of the neck collar and retracting the sealing cap of toward the neck collar of the removable apparatus and against the mouth opening of the glass beverage bottle;
measuring the pressure internal to the glass beverage bottle via a pressure indicator coupled with the removable apparatus and displaying the measured pressure via the pressure indicator;
retaining the pressure internal to the glass beverage bottle via a Pressure Reduction Valve (PRV) coupled with the removable apparatus configured to limit the pressure inside of the glass beverage bottle to a pre-determined maximum pressure limit; and
evacuating sediment from the neck section of the glass beverage bottle when the glass beverage bottle is in an inverted position by opening of a ball valve coupled with the removal apparatus without requiring freezing of the neck section of the glass beverage bottle.

19. The method of claim 18:
wherein injecting the yeast and the sugar into the glass beverage bottle comprises one of:
mixing the yeast and the sugar with the base beverage to form an external mixture mixed outside of the glass beverage bottle and injecting the mixture into the glass beverage bottle through the removable apparatus;
injecting the external mixture into the glass beverage bottle prior to attaching the removable apparatus;
mixing the yeast and the sugar with the base beverage within the glass beverage by injecting each of the yeast and the sugar and the base beverage through the removable apparatus; or mixing the yeast and the sugar with the base beverage within the glass beverage prior to attaching the removable apparatus.

20. The method of claim 18:
wherein the removable apparatus is formed from a top portion and a bottom portion to be joined via complementary quick connect and quick disconnect ends;
wherein the top portion includes a 3-way coupler to join the PRV and the pressure indicator with a first quick connect end;
wherein the bottom portion includes sealing cap coupled with the ball valve and coupled with a second quick connect end complementary to the first quick connect end; and
wherein the method further comprises joining the top portion and the bottom portion by connecting the first and second quick connect ends together.

* * * * *